US 6,643,043 B2

(12) United States Patent
Kato

(10) Patent No.: US 6,643,043 B2
(45) Date of Patent: Nov. 4, 2003

(54) SCANNING OPTICAL DEVICE AND IMAGE FORMING APPARATUS

(75) Inventor: Manabu Kato, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 09/768,498

(22) Filed: Jan. 25, 2001

(65) Prior Publication Data

US 2001/0035943 A1 Nov. 1, 2001

(30) Foreign Application Priority Data

Jan. 28, 2000 (JP) ........................................ 2000-020074

(51) Int. Cl.⁷ .............................................. G02B 26/08
(52) U.S. Cl. ...................................... 359/206; 359/217
(58) Field of Search ................................ 359/205, 206, 359/212, 216, 217, 218; 399/216, 218

(56) References Cited

U.S. PATENT DOCUMENTS

| 5,179,465 A | | 1/1993 | Kondo ....................... 359/218 |
| 5,838,480 A | * | 11/1998 | McIntyre et al. .............. 359/17 |
| 6,067,106 A | | 5/2000 | Ishibe et al. ................. 347/258 |
| 6,094,286 A | | 7/2000 | Kato ........................... 359/206 |
| 6,115,164 A | * | 9/2000 | Kamikubo .................... 359/17 |
| 6,133,935 A | | 10/2000 | Fujibayashi et al. ......... 347/258 |

FOREIGN PATENT DOCUMENTS

| JP | 3-231218 | 10/1991 | ........... G02B/26/10 |
| JP | 7-128603 | 5/1995 | ........... G02B/26/10 |
| JP | 10-232347 | 9/1998 | ........... G02B/13/00 |

\* cited by examiner

Primary Examiner—Mark A. Robinson
(74) Attorney, Agent, or Firm—Fitzpatrick, Cella, Harper & Scinto

(57) ABSTRACT

A scanning optical device and color image forming apparatus use a refraction element and diffraction element as the scanning optical element of a scanning optical device, the powers of the refraction element and diffraction element being set such that an imaging position deviation in the main scanning direction caused by a wavelength variation along with the environmental fluctuation of the scanning optical device and an imaging position deviation caused by the refractive index variation of the material of the scanning optical element are set to opposite directions at the two ends of an effective image region (effective scanning region). This reduces imaging position deviation caused by an environmental fluctuation, and limits imaging position deviation caused by a wavelength variation not accompanied by any environmental fluctuation. By this means it is possible with a simple arrangement at low cost to prevent color image misregistration between colors caused by a wavelength fluctuation or environmental fluctuation and largely to avoid density nonuniformity between colors.

19 Claims, 23 Drawing Sheets

SCANNING OPTICAL DEVICE AND IMAGE FORMING APPARATUS

BACKGROUND OF THE INVENTION

1. Field of the Invention

The present invention relates to a scanning optical device and image forming apparatus and, more particularly, to a compact image forming apparatus suitable for high-resolution printing with, e.g., a color electrophotographic process, such as a laser beam printer (LBP) or color digital copying machine, in which an imaging position variation caused by the wavelength fluctuation of a light source means, an aberration variation upon an environmental fluctuation, and the like in each scanning optical device are compensated by a compensation means in a color image forming apparatus having a plurality of scanning optical devices, thereby suppressing an imaging position deviation in especially the main scanning direction, and reducing color misregistration, and image density nonuniformity at low cost with a simple arrangement.

2. Related Background Art

Conventionally in a scanning optical device used in an image forming apparatus such as a laser beam printer or digital copying machine, a beam modulated and emitted by a light source means in accordance with an image signal is periodically deflected by an optical deflector formed from, e.g., a rotary polyhedral mirror (polygon mirror), and converged into a spot on a photosensitive recording medium (photosensitive drum) surface by an imaging optical system (scanning optical system) having an f-θ characteristic. This surface is optically scanned to record an image.

FIG. 24 is a schematic view showing the main part of a conventional scanning optical device.

In FIG. 24, a divergent beam emitted by a light source means 91 is converted into a nearly collimated beam by a collimator lens 92. The beam is limited by a stop 93, and enters a cylindrical lens 94 having a predetermined refracting power in only the sub scanning direction. Of the nearly collimated beam that enters the cylindrical lens 94, light components in the main scanning plane directly emerge as a nearly collimated beam. In the sub scanning plane, light components are converged to form an almost line image on a deflection surface (reflection surface) 95a of an optical deflector 95 formed from a rotary polyhedral mirror (polygon mirror).

The beam deflected and reflected by the deflection surface 95a of the optical deflector 95 is guided onto a photosensitive drum surface 98 as a surface to be scanned via an imaging optical element (f-θ lens) 96 having f-θ characteristics. By rotating the optical deflector 95 in a direction indicated by an arrow A, the beam scans the photosensitive drum surface 98 in a direction indicated by an arrow B to record image information.

FIG. 25 is a schematic view showing the main part of a conventional color image forming apparatus. In FIG. 25, the color image forming apparatus simultaneously uses a plurality of scanning optical devices 111 to 114 like the above-described one to record pieces of image information of respective colors on corresponding photosensitive drums 121 to 124, thereby forming a color image. In this color image forming apparatus, it is important to reduce not only an imaging position deviation represented by jitter of a single color but also scanning line deviations (to be referred to as "misregistration" hereinafter) between colors, and image density nonuniformity between colors in order to align a plurality of scanning lines and form an image. For this purpose, the scanning optical device must satisfy the following conditions.

(1) An imaging position variation (spot position deviation) in the main scanning direction along with the wavelength fluctuation of a beam emitted by a semiconductor laser serving as a light source (to be simply referred to as the "wavelength fluctuation of the semiconductor laser" hereinafter) is compensated.

(2) A focus variation in the sub scanning direction along with an environmental fluctuation such as influential temperature elevation is compensated (a focus variation in the main scanning direction is originally small and does not pose any problem in many cases).

(3) An imaging position deviation in the main scanning direction along with an environmental fluctuation such as temperature elevation is small.

(4) An imaging position deviation in the main scanning direction caused by a wavelength variation (not accompanied by any environmental fluctuation) is small.

The image forming apparatus requires not only stable optical performance in one scanning optical device (single color) but also an arrangement which can prevent misregistration or image nonuniformity between colors even when the light source wavelength (wavelength of a beam emitted by the light source), initial wavelength, or use environment (particularly ambient temperature) of the scanning optical device fluctuates, or even when the light source wavelengths, initial wavelengths, or use environments of a plurality of scanning optical devices differ.

Further, when such a color image forming apparatus uses a light source having a plurality of light-emitting portions represented by multi-beam lasers (e.g., multi-semiconductor lasers), jitter by a plurality of beams (scanning interval fluctuation in the main scanning direction on the photosensitive drum surface) occurs owing to the wavelength difference between the light-emitting portions, greatly degrading the image quality. To prevent this, (1) compensation of a spot position deviation and (4) compensation of a spot imaging position deviation not accompanied by any environmental fluctuation become more important.

Such a scanning optical device has conventionally used a glass lens or glass mirror which hardly exhibits a characteristic fluctuation caused by an environmental fluctuation. However, an aberration variation caused by the wavelength fluctuation of a semiconductor laser remains, advanced aberration correction by an aspherical surface cannot be performed, and the cost is high. Thus, demands have arisen for compensation of a wavelength fluctuation, environmental fluctuation, or the like by a scanning optical device using a plastic material.

Japanese Patent Application Laid-Open No. 3-231218 discloses a scanning optical device in which a scanning optical system is constituted by a glass spherical lens and plastic toric lens. In this reference, an imaging position deviation in the main scanning direction caused by a wavelength variation of 5 nm is 64.6 μm, and a focus deviation in the sub scanning direction at a temperature elevated by 25° C. is +1.7 mm. For example, a color image forming apparatus using a plurality of such scanning optical devices suffers misregistration or image nonuniformity between colors.

Japanese Patent Application Laid-Open No. 7-128603 discloses an example in which a glass lens and glass cylinder mirror are used as the scanning optical system of a scanning optical device used in a color image forming apparatus. In this reference, all the scanning optical systems are made of a glass material. An aberration variation caused by the wavelength fluctuation of a semiconductor laser remains. Aberration correction by an aspherical surface cannot be performed, so the optical path is long. In addition, the cost is high.

Japanese Patent Application Laid-Open No. 10-232347 discloses an example in which a scanning optical system is formed from two toric lenses. In this reference, all the scanning optical systems are made of a plastic, which is advantageous for aberration correction. However, the laser wavelength increases as the temperature is elevated. When the refractive index of the scanning optical system decreases, the laser wavelength varies in a direction in which the focal length of a scanning lens increases. As a result, the imaging position in the main scanning direction greatly deviates.

It is an object of the present invention to provide a compact scanning optical device and color image forming apparatus suitable for high-resolution printing in which an imaging position variation caused by the wavelength fluctuation of a light source means, an aberration variation upon an environmental fluctuation, and the like in each scanning optical device are compensated by a compensation means (third optical element) in a color image forming apparatus having a plurality of scanning optical devices, thereby suppressing an imaging position deviation in especially the main scanning direction, and reducing color misregistration and image density nonuniformity at low cost with a simple arrangement.

It is another object of the present invention to provide a scanning optical device and color image forming apparatus suitable for high-resolution printing in which an aberration variation accompanied by the environmental fluctuation of each scanning optical device and an aberration variation not accompanied by any environmental fluctuation are suppressed in a color image forming apparatus having a plurality of scanning optical devices, thereby reducing color misregistration and image density nonuniformity at low cost with a simple arrangement.

SUMMARY OF THE INVENTION

According to one aspect of the invention, a scanning optical device comprises light source means, and an optical element having a refraction element and a diffraction element, wherein powers of said refraction element and said diffraction element are set such that an imaging position deviation in a main scanning direction on a surface to be scanned that is caused by a wavelength variation of a beam emitted by said light source means along with an environmental fluctuation of said scanning optical device, and an imaging position deviation in the main scanning direction on the surface to be scanned that is caused by a refractive index variation of a material of said optical element along with an environmental fluctuation are set to be in opposite directions at two ends of an effective scanning region.

According to further aspect of the invention, said optical element includes an element which forms the beam emitted by said light source means into an image on the surface to be scanned, and letting $\phi Lm$ and $\phi Dm$ be powers of said refraction element and diffraction element constituting said optical element in the main scanning direction, and $vL$ be an Abbe number of a material of said refraction element, the powers satisfy a condition:

$$vL/6.90 \leq \phi Lm/\phi Dm \leq vL/3.45$$

According to further aspect of the invention, an imaging position variation per unit mode hopping of said light source means is not more than 3 $\mu$m at the two ends of the effective scanning region.

According to further aspect of the invention, a focus position deviation in a sub scanning direction on the surface to be scanned that is caused by the wavelength variation of the beam emitted by said light source means along with the environmental fluctuation, and a focus position deviation in the sub scanning direction on the surface to be scanned that is caused by the refractive index variation of the material of said optical element along with the environmental fluctuation are substantially compensated within the effective scanning region.

According to further aspect of the invention, the environmental fluctuation includes an atmospheric variation of said scanning optical device and a temperature variation caused by self-temperature elevation.

According to further aspect of the invention, said refraction element includes a toric lens, and said diffraction element includes a composite optical element obtained by integrating a refraction surface and a diffraction surface.

According to further aspect of the invention, said refraction element and diffraction element constituting said optical element are formed from a plastic material.

According to further aspect of the invention, said light source means includes a multi-beam laser source having a plurality of light-emitting portions.

According to further aspect of the invention, letting $\phi Ls$ and $\phi Ds$ be powers of said refraction element and diffraction element constituting said optical element in a sub scanning direction, the powers satisfy a condition:

$$1.0 \leq \phi Ls/\phi Ds \leq 2.6$$

According to further aspect of the invention, the powers of said refraction element and said diffraction element are set to compensate for an imaging position variation in the main scanning direction on the surface to be scanned that is caused by a wavelength fluctuation of the beam emitted by said light source means.

According to one aspect of the invention, an image forming apparatus comprises a plurality of pairs of scanning optical devices defined in claim 1 and corresponding image carriers, guides beams emitted by said scanning optical devices to corresponding image carriers, scans surfaces of said image carriers to form images of different colors on the surfaces of said image carriers, and forms a color image by the images formed on the surfaces of said image carriers.

According to one aspect of the invention, a scanning optical device guides a beam emitted by light source means to a surface to be scanned, and scans the surface with the beam, wherein said scanning optical device comprises compensation means having a refraction element and a diffraction element so as to compensate for an imaging position deviation in a main scanning direction on the surface to be scanned that is caused by a wavelength fluctuation of the beam emitted by said light source means, and letting $\phi Lm$ and $\phi Dm$ be powers of said refraction element and said diffraction element in the main scanning direction, the powers satisfy a condition:

$$5.8 \leq \phi Lm/\phi Dm \leq 20$$

According to further aspect of the invention, a focus position variation in a sub scanning direction on the surface to be scanned that is caused by an environmental fluctuation of said scanning optical device is compensated by power variations of said refraction element and said diffraction element, and a wavelength variation of the beam emitted by said light source means.

According to further aspect of the invention, said refraction element is formed from a plastic material.

According to further aspect of the invention, said compensation means includes means for forming the beam emitted by said light source means into an image on the surface to be scanned.

According to further aspect of the invention, said light source means includes a multi-beam laser source having a plurality of light-emitting portions.

According to further aspect of the invention, said compensation means includes means for compensating for an imaging position variation in the main scanning direction on the surface to be scanned that is caused by the wavelength fluctuation of the beam emitted by said light source means, and a scanning interval fluctuation in the main scanning direction on the surface to be scanned that is caused by a wavelength difference between beams emitted by a plurality of light-emitting portions.

According to one aspect of the invention, an image forming apparatus comprises a plurality of pairs of scanning optical devices set out in the foregoing and corresponding image carriers, guides beams emitted by said scanning optical devices to corresponding image carriers, scans surfaces of said image carriers to form images of different colors on the surfaces of said image carriers, and forms a color image by the images formed on the surfaces of said image carriers.

According to one aspect of the invention, an image forming apparatus comprises a scanning optical device set out in the foregoing and a printer controller for converting code data input from an external device into an image signal and inputting the converted image signal to said scanning optical device.

DETAILED DESCRIPTION OF THE PREFERRED EMBODIMENTS

[First Embodiment]

Figure 1:
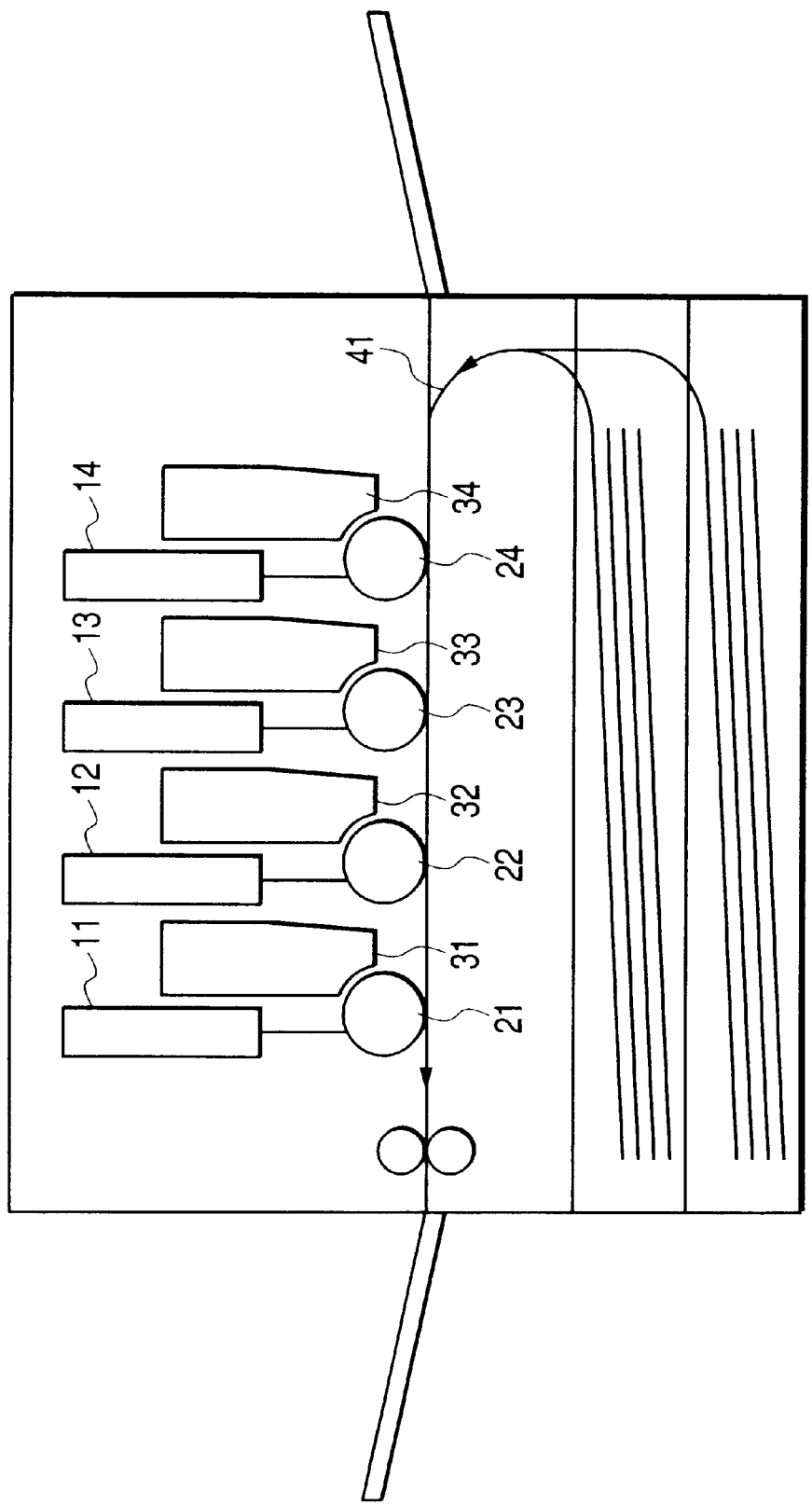
FIG. 1 is a schematic view showing the main part of a color image forming apparatus according to the first embodiment of the present invention.

FIG. 1 is a schematic view showing the main part of a color image forming apparatus according to the first embodiment of the present invention.

In FIG. 1, scanning optical devices 11, 12, 13, and 14, photosensitive drums 21, 22, 23, and 24 serving as image carriers, and developing units 31, 32, 33, and 34 are arranged along a convey belt 41. In the color image forming apparatus of the first embodiment, as will be described below, the four scanning optical devices (11, 12, 13, and 14) in which an imaging position variation caused by the wavelength fluctuation of a beam emitted by a light source (to be simply referred to as the "wavelength fluctuation of the light source" hereinafter) or an aberration variation upon an environmental variation (temperature variation) are arranged, respectively correspond to four, C (Cyan), M (Magenta), Y (Yellow), and B (Black) colors, and record image signals (image information) on the surfaces of the photosensitive drums 21, 22, 23, and 24 in parallel with each other, thereby printing a color image at a high speed.

A method of appropriately correcting an imaging position variation caused by the wavelength fluctuation of a light source or an aberration variation upon an environmental fluctuation, which is a characteristic feature of the present invention, and an optical element therefor will be explained.

Figure 2:
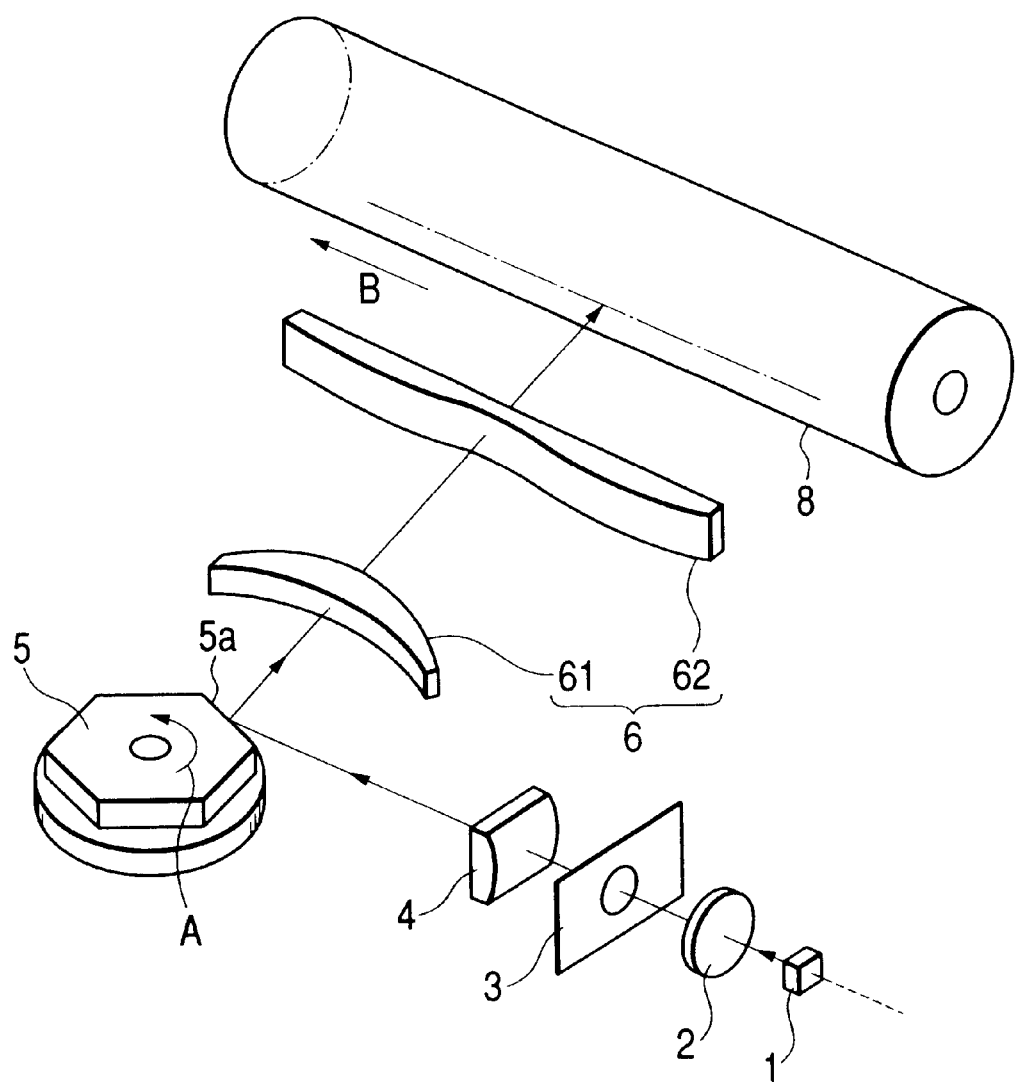
FIG. 2 is a schematic view showing the main part of a scanning optical device shown in FIG. 1 and a corresponding image carrier.
Figure 3:
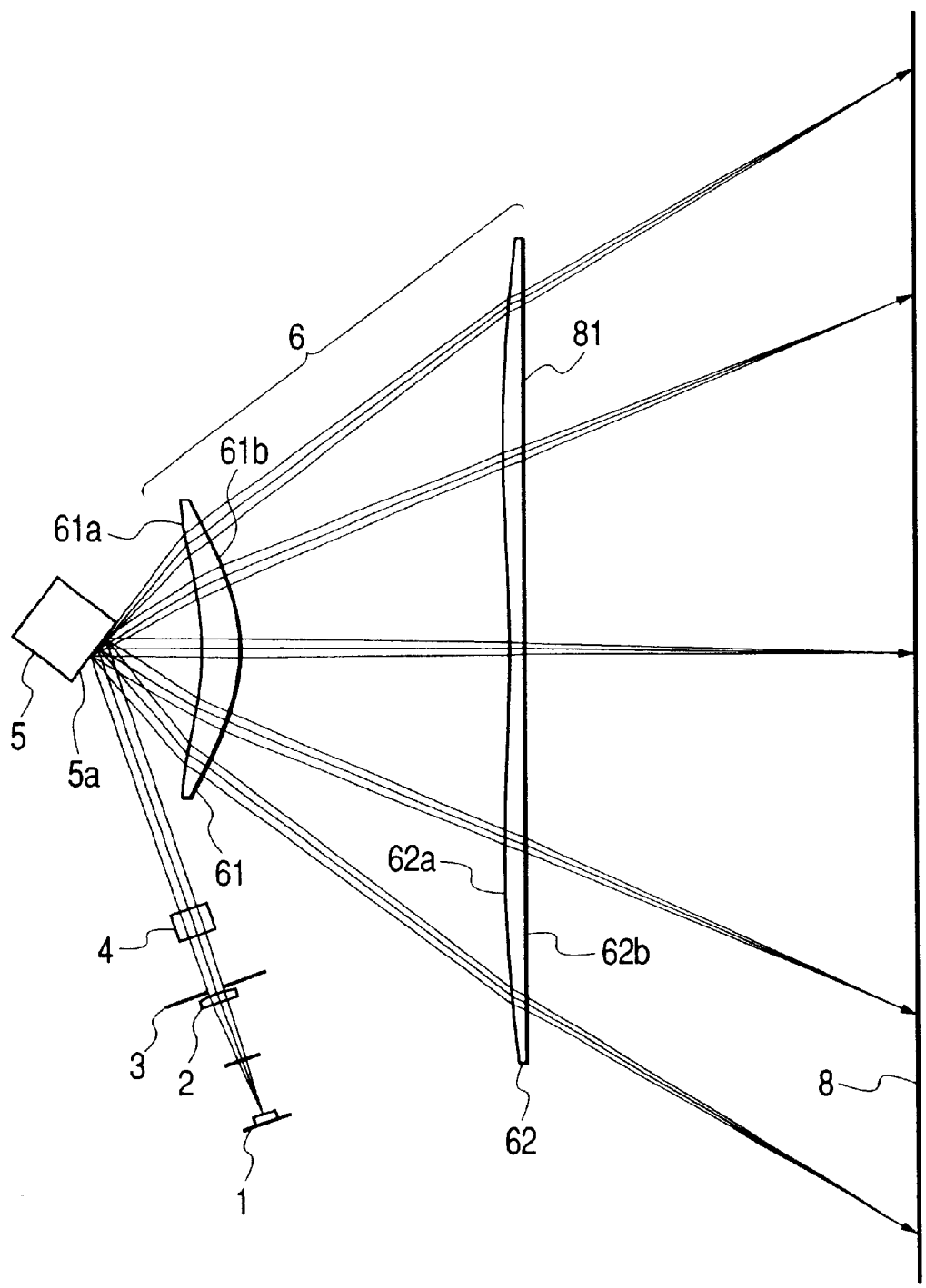
FIG. 3 is a sectional view showing the main part of an optical system shown in FIG. 2 in the main scanning direction.

FIG. 2 is a schematic view showing the main part of one scanning optical device and a corresponding image carrier, and FIG. 3 is a sectional view (sectional view of main scanning) showing the main part of the optical system shown in FIG. 2 in the main scanning direction.

In FIGS. 2 and 3, a light source means (laser source) 1 is formed from, e.g., a semiconductor laser. A collimator lens 2 serving as a first optical element converts a divergent beam emitted by the light source means 1 into a nearly collimated beam. An aperture stop 3 limits a passing beam (light quantity). A cylindrical lens (cylinder lens) 4 serving as a second optical element has a predetermined refracting power in only the sub scanning direction, and forms the beam having passed through the aperture stop 3 into an almost line image on a deflection surface (reflection surface) 5a of an optical deflector 5 (to be described later).

The optical deflector 5 serving as a deflection element is formed from, e.g., a polygon mirror (rotary polyhedral mirror), and rotated by a driving means (not shown) such as a motor at a predetermined speed in a direction indicated by an arrow A in FIG. 2.

A scanning optical element 6 as a third optical element (compensation means) having an f-θ characteristic has a refraction element 61 and diffraction element 62. The refraction element 61 is formed from a single plastic toric lens having different powers in the main scanning direction and sub scanning direction. Two lens surfaces 61a and 61b of the toric lens 61 in the main scanning direction are aspherical.

The diffraction element 62 is formed from an elongated composite optical element having different powers in the main scanning direction and sub scanning direction. An incident-side surface 62a of the composite optical element 62 is an aspherical surface having a predetermined power in only the main scanning direction (surface in the sub scanning direction is flat), whereas an exit-side surface 62b is a diffraction surface with a diffraction grating 81 added to a flat surface. The grating shape of the diffraction grating 81 is preferably a Fresnel grating shape of a sawtooth-like diffraction grating by surface cutting, or a stepped diffraction grating shape by photoetching. The composite optical element 62 in this embodiment is made of a plastic prepared by injection molding. The same effects can also be obtained by forming a diffraction grating from a replica on a glass substrate.

In the first embodiment, the toric lens 61 is disposed on the polygon mirror 5 side with respect to the midpoint between the rotating shaft of the polygon mirror 5 and a surface 8 to be scanned, and the composite optical element 62 is disposed on the surface 8 side. Each optical element has different powers in the main scanning direction and sub scanning direction, as described above. These optical elements form a deflected beam from the polygon mirror 5 into an image on the surface 8, and correct the face tangle error of the deflection surface of the polygon mirror. The surface 8 to be scanned is a photosensitive drum surface.

The color image forming apparatus in this embodiment forms latent images on the surfaces of the corresponding photosensitive drums 21, 22, 23, and 24 by the four scanning optical devices 11, 12, 13, and 14 using beams based on modulated signals. For example, the color image forming apparatus forms C (Cyan), M (Magenta), Y (Yellow), and B (Black) latent images on the surfaces of the corresponding photosensitive drums 21, 22, 23, and 24, and multiple-transfers the latent images on a recording medium to form one full-color image.

In the scanning optical device of this embodiment, a divergent beam emitted by the semiconductor laser 1 is converted into a nearly collimated beam by the collimator lens 2. The beam (light quantity) is limited by the aperture stop, and enters the cylindrical lens 4. Of the nearly collimated beam that enters the cylindrical lens 4, light components in the main scanning section directly emerge as a nearly collimated beam. In the sub scanning section, light components are converged to form an almost line image (elongated line image in the main scanning direction) on the deflection surface 5a of the optical deflector 5. The beam deflected by the deflection surface 5a of the optical deflector 5 is guided onto the photosensitive drum surface 8 via the toric lens 61 and composite optical element 62. By rotating the optical deflector 5 in a direction indicated by an arrow A, the beam scans the photosensitive drum surface 8 in a direction indicated by an arrow D (main scanning direction). As described above, e.g., C (Cyan), M (Magenta), Y (Yellow), and B (Black) latent images are formed on the surfaces of the corresponding photosensitive drums 21, 22, 23, and 24, and multiple-transferred to a recording medium to form one full-color image.

The toric lens 61 and composite optical element 62 which constitute the third optical element (scanning optical element) 6 of the scanning optical device in the first embodiment have the following shapes.

Refraction surface . . . aspherical shape whose main scanning direction can be represented by a function up to 10th order.

The intersection between the refraction surface and the optical axis is defined as the origin. The x-axis is set along the optical axis direction, the y-axis is set along an axis perpendicular to the optical axis in the main scanning section, and the z-axis is set along an axis perpendicular to the optical axis in the sub scanning section.

At this time, the meridional direction corresponding to the main scanning direction is given by $$x = \frac{Y^2/R}{1+(1-(1+K)(Y/R)^2)^{1/2}} + B_4Y^4 + B_6Y^6 + B_8Y^8 + B_{10}Y^{10}$$

(where R is the radius of curvature, and K, $B_4$, $B_6$, $B_8$, and $B_{10}$ are aspherical coefficients.)

The sagittal direction corresponding to the sub scanning direction (direction including the optical axis and perpendicular to the main scanning direction) is given by $$S = \frac{Z^2/r'}{1 + (1-(Z/r')^2)^{1/2}}$$

for $r' = r_0(1 + D_2Y^2 + D_4Y^4 + D_6Y^6 + D_8Y^8 + D_{10}Y^{10})$ (where $r_0$ is the sagittal radius of curvature on the optical axis, and $D_2$, $D_4$, $D_6$, $D_8$, and $D_{10}$ are aspherical coefficients.)

Diffraction surface . . . diffraction surface whose main scanning direction is represented by a function up to 6th order and sub scanning direction is represented by a 2nd-order phase function which changes depending on the position of the main scanning direction, which is represented by $$\phi = m\lambda = b_2Y^2 + b_4Y^4 + b_6Y^6 + (d_0 + d_1Y + d_2Y^2 + d_3Y^3 + d_4Y^4)Z^2$$

(where $\phi$ is the phase function, m is the order of diffraction, $\lambda$ is the wavelength used, Y is the height from the optical axis of the lens, $b_2$, $b_4$, $b_6$, $d_0$, $d_1$, $d_2$, $d_3$, and $d_4$ are phase coefficients, and +1st-order diffracted light is used in the first to sixth embodiments.)

In this embodiment, the power layout of the toric lens 61 made of a plastic (polyolefin material: available from Zeonex) and the composite optical element 62 can be appropriately set to compensate for both an imaging position variation caused by the wavelength fluctuation of the light source in the main scanning direction and a focus variation caused by the environmental fluctuation (particularly temperature elevation) of the device in the sub scanning direction.

More specifically, in the first embodiment, the chromatic aberration of magnification of the scanning optical system is compensated in the main scanning direction by the refraction element (refraction portion) 61 having a positive dispersion and the diffraction element (diffraction portion) 62 having a negative dispersion (chromatic compensation of magnification). Letting $\phi Lm$ be the power of the refraction element 61 in the main scanning direction, $\nu L$ be the Abbe number of the material of the refraction element 61, $\phi Dm$ be the power of the diffraction element 62 in the main scanning direction, and $\nu D$ be the Abbe number of the material of the diffraction element 62, the power layout desirably satisfies $$\phi Lm/\nu L + \phi Dm/\nu D = 0$$

The Abbe number has a limited range of values. The Abbe number is $20 \leq \nu L \leq 70$ as the distribution range of a general plastic material or glass material for the refraction element 61, and $\nu D = -3.45$ for the diffraction element 62 regardless of its material. The power ratio of the refraction element 61 to the diffraction element 62 in the main scanning direction desirably satisfies a condition:

$$5.8 \leq \phi Lm/\phi Dm \leq 20 \quad (1)$$

Condition (1) is related to the power ratio of the refraction element 61 to the diffraction element 62 in the main scanning direction that constitute the scanning optical element 6. A power layout which does not satisfy condition (1) is undesirable because it becomes difficult to correct an imaging position variation in the main scanning direction on the surface 8 to be scanned that is caused by the wavelength variation of the semiconductor laser 1.

In the sub scanning direction, the refractive index variation of the optical element caused by the environmental fluctuation (particularly temperature elevation) of the device is compensated by the wavelength variation of the semiconductor laser 1 caused by the same environmental fluctuation, thereby canceling focus movement (temperature compensation). A refractive index variation dn/dt and wavelength variation d$\lambda$/dt per unit temperature are set to $$dn/dt = -1.0E-4/° C.$$

$$d\lambda/dt = 0.255 \text{ nm}/° C.$$

Considering the refractive index of the material of the refraction element 61, and the possible value of the Abbe number, the power layout is desirably set to $$1.0 \leq \phi Ls/\phi Ds \leq 2.6 \quad (2)$$

where $\phi$Ls: power of the refraction element in the sub scanning direction $\phi$Ds: power of the diffraction element in the sub scanning direction Condition (2) is related to the power ratio of the refraction element 61 to the diffraction element 62 in the sub scanning direction that constitute the scanning optical element 6. A power layout which does not satisfy condition (2) is undesirable because it becomes difficult to correct a focus variation in the sub scanning direction along with the environmental fluctuation of the scanning optical device.

Table 1 shows the optical layout in the first embodiment, aspherical coefficients of the toric lens 61, and aspherical coefficients and phase terms of the composite optical element 62.

TABLE 1

Numerical Data of First Embodiment
Design Data

| Wavelength, Refractive Index | | | Surface Shape of Toric Lens 61 | | | Surface Shape of Elongated Diffraction Element 62 | |
|---|---|---|---|---|---|---|---|
| Wavelength Used | $\lambda$ (nm) | 780 | First Surface | Second Surface | | First Surface | Second Surface |
| Refractive Index of Toric Lens 61 | ndt | 1.5306 | R  −8.37256E+01 | −4.46398E+01 | R | −3.27422E+02 | ∞ |
| ↑ Abbe Number | vdt | 55.5 | K  −8.85666E+00 | −5.33951E−01 | K | −8.52087E+01 | |
| Refractive Index of Elongated Diffraction Element 62 | ndd | 1.5306 | B4  9.81713E−07 | 1.65579E−06 | B4 | 1.59236E−07 | |
| ↑ Abbe Number | vdd | 55.5 | B6  −5.17945E−11 | 3.79299E−10 | B6 | −1.10765E−11 | |
| Light Ray Angle | | | r  1.25787E+02 | −2.33970E+01 | B8 | 3.70722E−16 | |
| Angle of Incidence on Polygon | $\theta$p | −70.0 | D2s | 1.42600E−04 | B10 | −4.86087E−21 | |

TABLE 1-continued

Numerical Data of First Embodiment
Design Data

| | | | | | Phase Function of Elongated Diffraction Element 62 | |
|---|---|---|---|---|---|---|
| | | | | | First Surface | Second Surface |
| Polygon Maximum Exit Angle | θe | 45.0 | D4s | 5.10858E−08 | | |
| | | | D6s | 3.98672E−13 | | |
| Layout | | | D2e | 2.14316E−04 | b2 | −1.72316E−04 |
| Polygon Surface - Toric Lens | e1 | 30.0 | D4e | −1.22319E−08 | b4 | 1.61040E−09 |
| Toric Lens Central Thickness | d1 | 11.0 | D6e | 3.61202E−11 | b6 | −1.12978E−13 |
| Toric Lens - Elongated Diffraction Element | e2 | 75.0 | | | d0 | −5.10910E−03 |
| Elongated Diffraction Element Central Thickness | d2 | 4.0 | | | d1 | 1.35226E−06 |
| Elongated Diffraction Element - Surface to be Scanned | Sk | 110.0 | | | d2 | 6.65427E−08 |
| Polygon Axis - Surface to be Scanned | L | 230.0 | | | d3 | −6.20669E−11 |
| Effective Scanning Width | W | 297.0 | | | d4 | 1.01220E−12 |

Suffices s indicate laser side
Suffices e indicate side opposite to laser
Y-axis sign + indicates side opposite to laser Power ratios of the refraction element 61 to the diffraction element 62 in the first embodiment are Main Scanning Direction: φLm/φDm=14.7

Sub Scanning Direction: φLs/φDs=2.5

These power ratios meet conditions (1) and (2).

Figure 4:
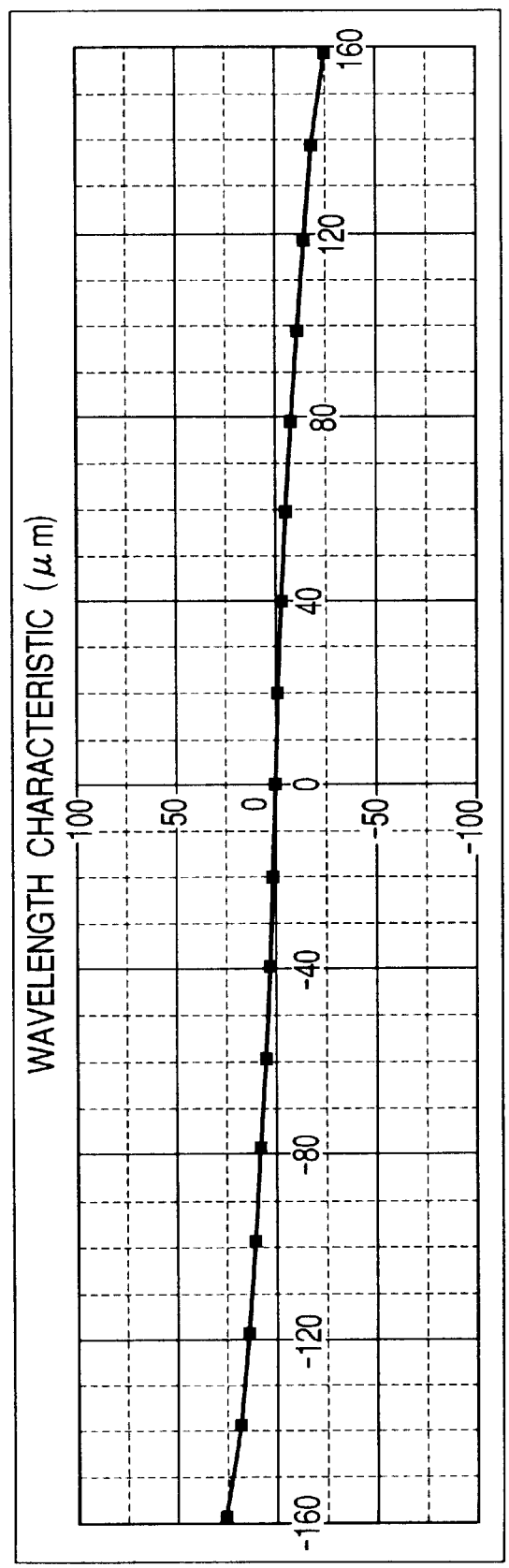
FIG. 4 is a graph showing an imaging position variation in the main scanning direction caused by a wavelength variation in the first embodiment of the present invention.

FIG. 4 is a graph showing an imaging position variation in the main scanning direction caused by the wavelength variation of the semiconductor laser 1 in the first embodiment. FIG. 4 shows a difference (5 nm) from the initial wavelength of the semiconductor laser 1.

Figure 5:
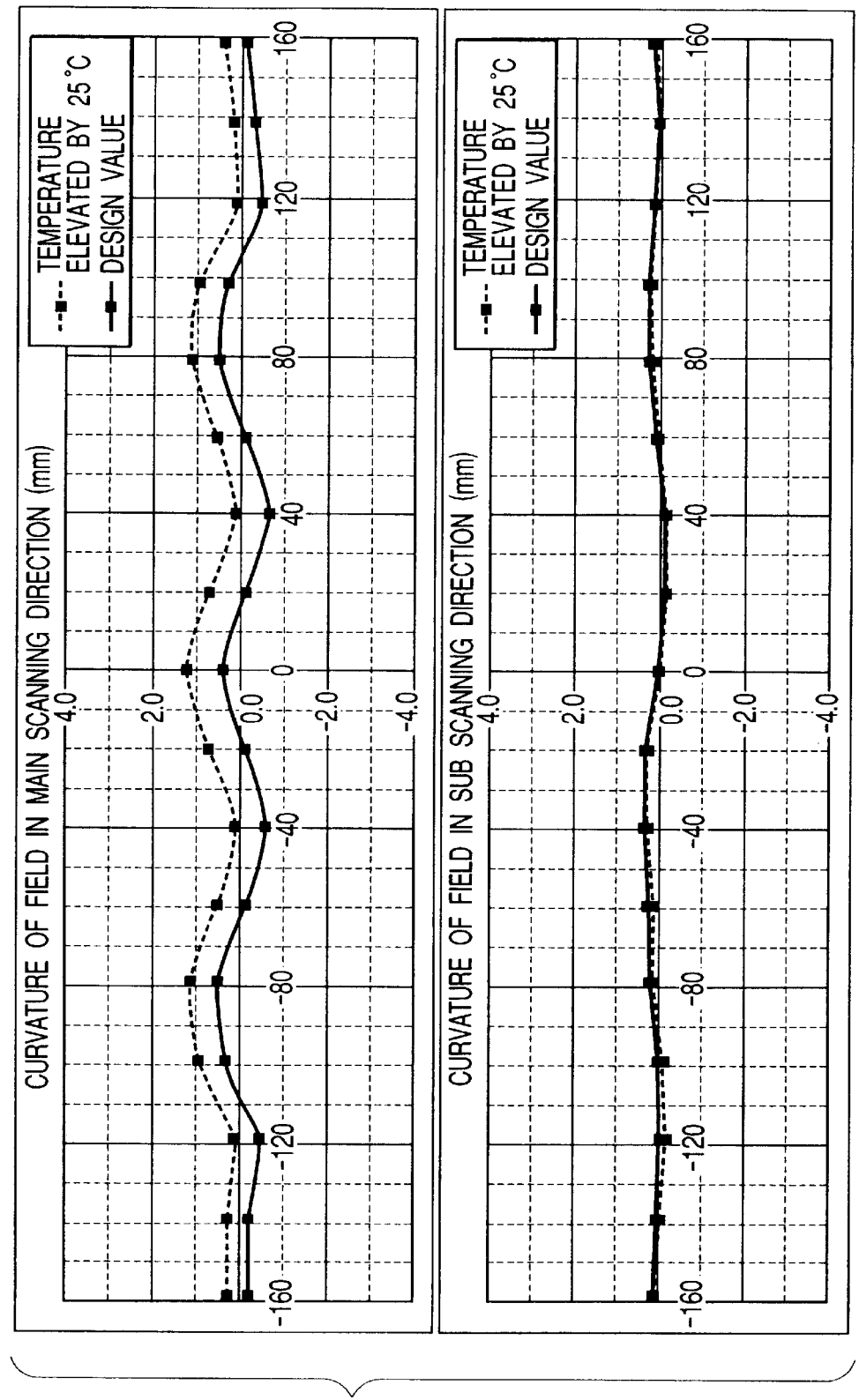
FIG. 5 is a graph showing an imaging position variation in the main scanning direction caused by a wavelength variation in the first embodiment of the present invention.

FIG. 5 is a graph showing paraxial aberration (curvature of field in the main scanning direction and sub scanning direction) before and after an environmental fluctuation in the first embodiment. The solid line represents a characteristic (design value) before an environmental fluctuation, and the broken line represents a characteristic (effective value) when the temperature is elevated by 25° C.

Generally in an apparatus which forms a color image by recording pieces of image information of respective colors on a plurality of photosensitive drums by a plurality of scanning optical devices, an imaging position deviation in the main scanning direction caused by the wavelength fluctuation of a semiconductor laser must be suppressed to 50 μm or less, and focus deviations in the main scanning direction and sub scanning direction caused by the environmental fluctuation (temperature fluctuation) of the device must be suppressed to ±1.0 mm or less, in order that misregistration between colors and image density nonuniformity between colors may be visually inconspicuous.

From FIG. 4, an imaging position deviation caused by a wavelength difference of +5 nm is 41 μm in the first embodiment, and corresponds to a pixel (position) deviation suppressed within about one pixel in, e.g., a printer having a resolution of 600 dpi. The initial wavelength deviation of a semiconductor laser between a plurality of colors, or mode hopping in activation is permitted by about 5 nm. Note that the initial wavelength deviation of a semiconductor laser between a plurality of colors means the individual difference between the wavelengths of respective semiconductor lasers in an image forming apparatus (so-called 4-drum color printer) which scans a plurality of image carrier surfaces with beams from a plurality of scanning optical devices.

Similarly from FIG. 5, the focus movement amount in the sub scanning direction at a temperature elevated by 25° C. is 0.2 mm, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

The first embodiment compensates for all these environmental fluctuations using a plastic optical element. This can simultaneously reduce the manufacturing cost by molding and shorten the optical path by large-field-angle aberration correction using an aspherical surface.

As described above, the first embodiment uses the plastic toric lens 61 and composite optical element 62 as the scanning optical element 6 of the scanning optical device, and records images on a plurality of photosensitive drums by a plurality of scanning optical devices. A color image forming apparatus in which misregistration between colors caused by a wavelength fluctuation or environmental fluctuation, and density nonuniformity between colors are reduced can be implemented with a simple arrangement at low cost.

[Second Embodiment]

Figure 6:
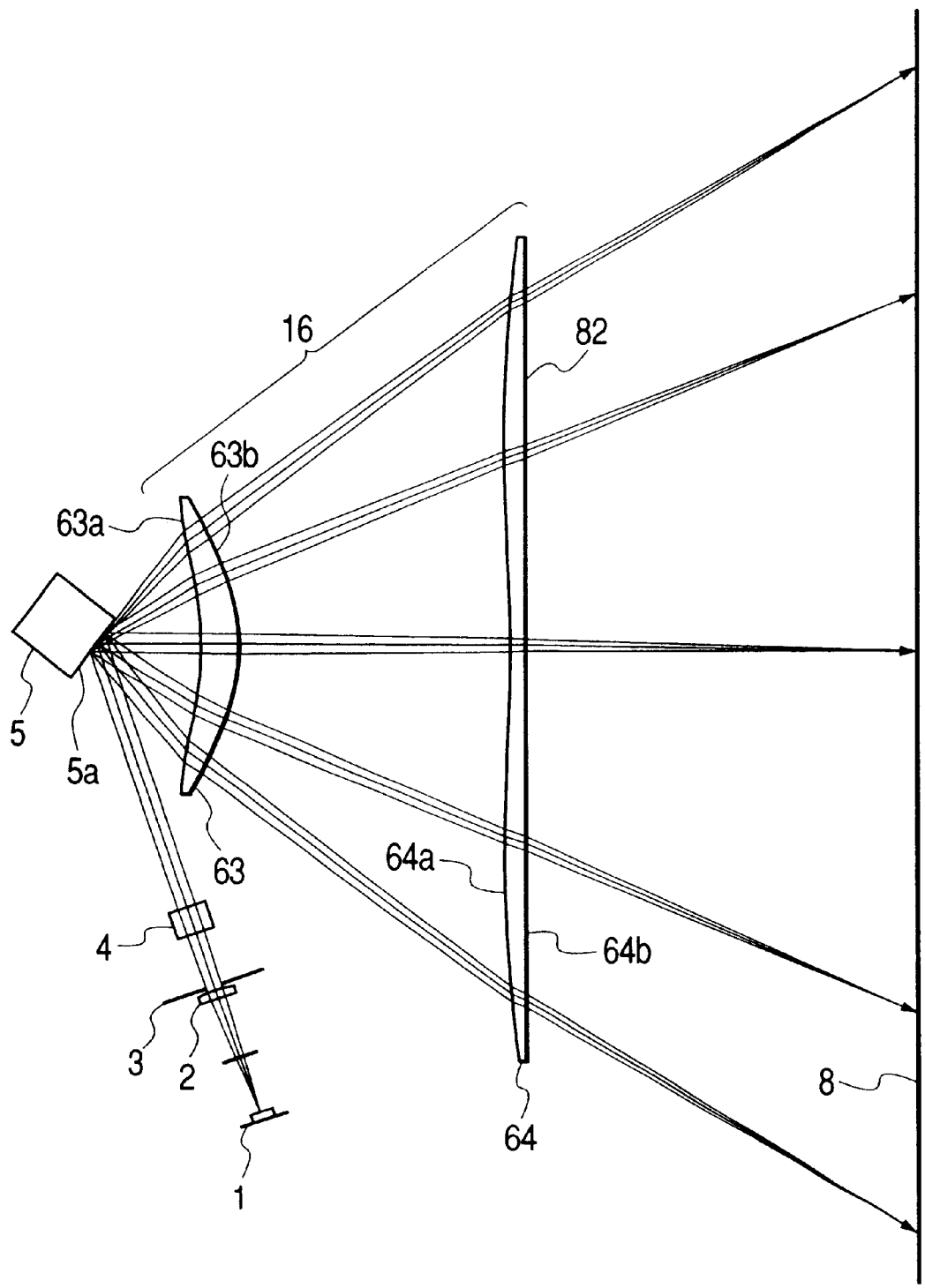
FIG. 6 is a sectional view showing the main part of the optical system of a scanning optical device constituting a color image forming apparatus in the main scanning direction according to the second embodiment of the present invention.

FIG. 6 is a sectional view of the main part of an optical system in the main scanning direction showing one of a plurality of scanning optical devices constituting a color image forming apparatus according to the second embodiment of the present invention, and a corresponding photosensitive drum. In FIG. 6, the same reference numerals as in FIG. 3 denote the same parts.

The second embodiment is different from the first embodiment in that a plastic toric lens as a refraction element is made of a material such as polycarbonate (PC) having a large dispersion, and that the power ratio of the refraction element to the diffraction element is optimized along with this change. The remaining arrangement and optical operation are almost the same as in the first embodiment, and provide the same effects.

In FIG. 6, a scanning optical element 16 as a third optical element (compensation means) having an f-θ characteristic has a refraction element 63 and diffraction element 64. The refraction element 63 is formed from a single plastic toric lens of a material such as polycarbonate (PC) having a large dispersion with different powers in the main scanning direction and sub scanning direction. Two lens surfaces 63a and 63b of the toric lens 63 in the main scanning direction are aspherical.

The diffraction element 64 is formed from an elongated composite optical element having different powers in the main scanning direction and sub scanning direction. An incident-side surface 64a of the composite optical element 64 is an aspherical surface having a predetermined power in only the main scanning direction (surface in the sub scanning direction is flat), whereas an exit-side surface 64b is a diffraction surface with a diffraction grating 82 added to a flat surface.

Figure 7:
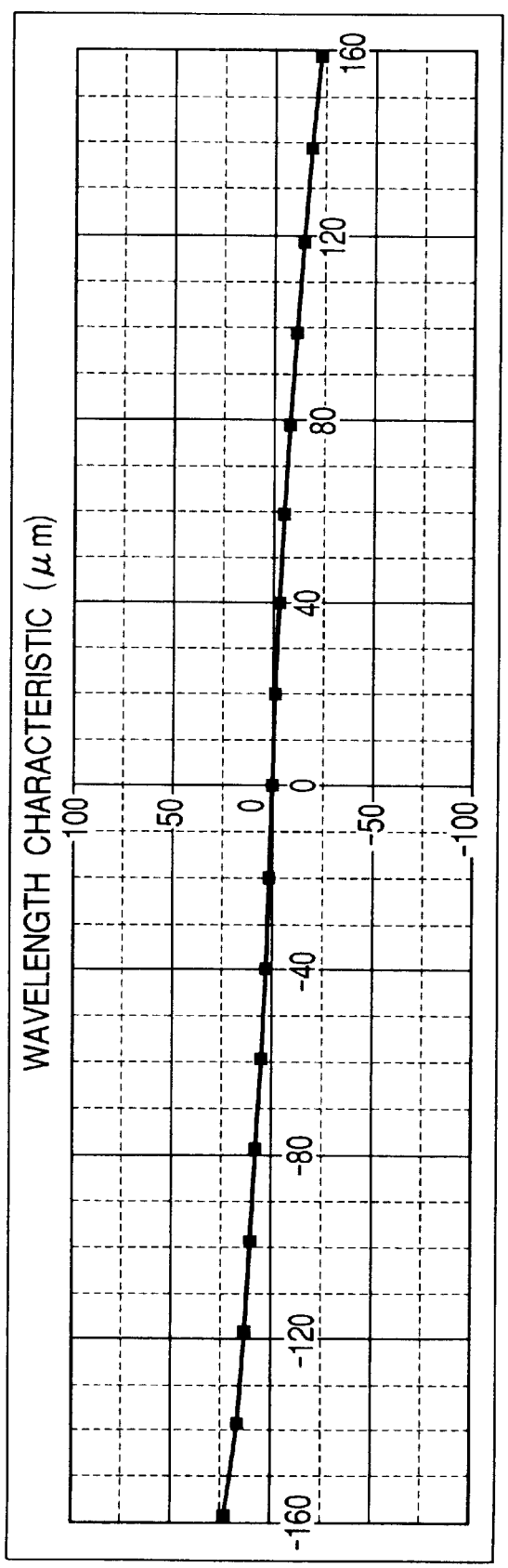
FIG. 7 is a graph showing an imaging position variation in the main scanning direction caused by a wavelength variation in the second embodiment of the present invention.

Table 2 shows the optical layout in the second embodiment, aspherical coefficients of the toric lens 63, and aspherical coefficients and phase terms of the composite optical element 64.

variation of the semiconductor laser 1 in the second embodiment. FIG. 7 shows a difference (5 nm) from the initial wavelength of the semiconductor laser 1.

Figure 8:
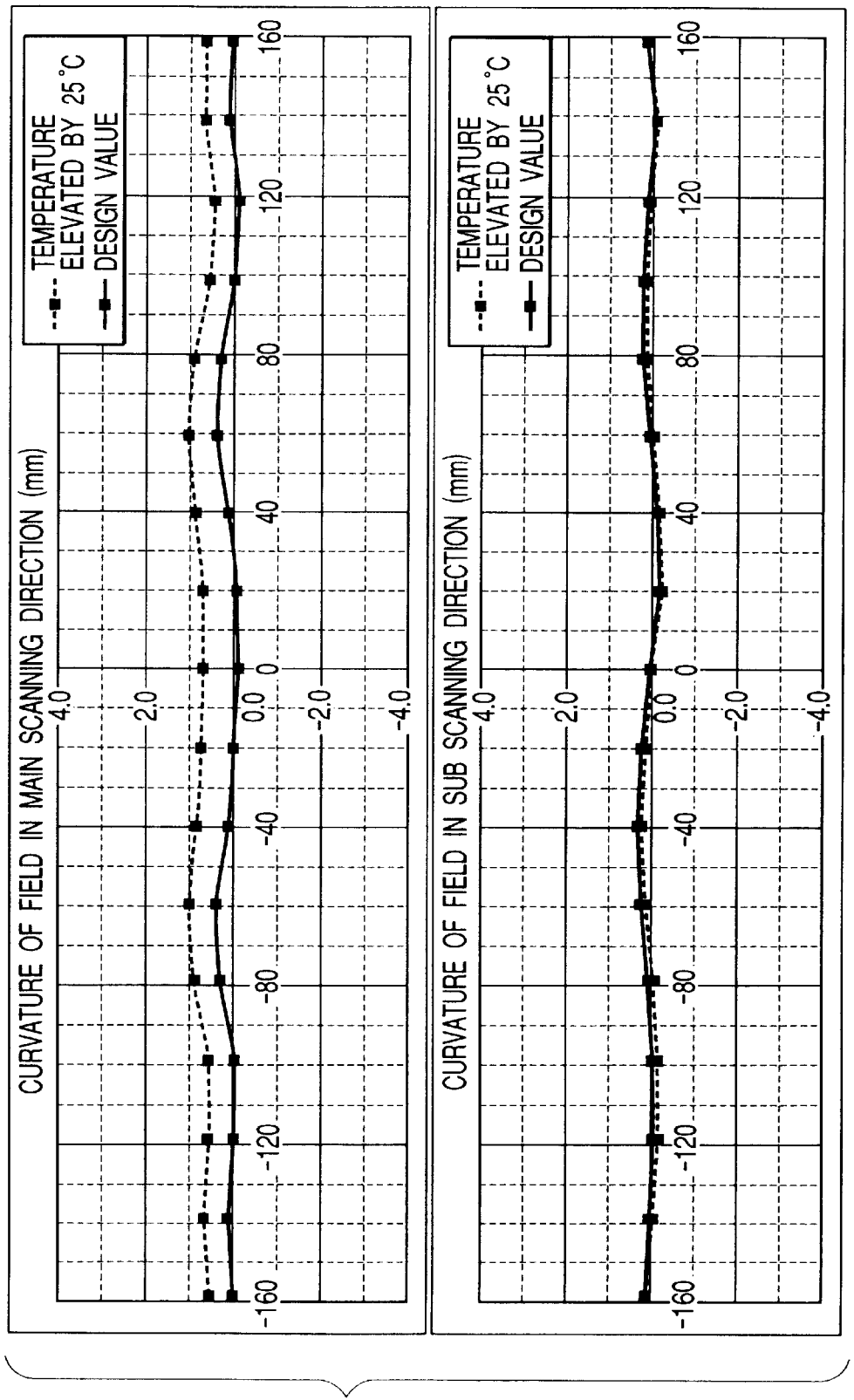
FIG. 8 is a graph showing an imaging position variation in the main scanning direction caused by a wavelength variation in the second embodiment of the present invention.

FIG. 8 is a graph showing paraxial aberration (curvature of field in the main scanning direction and sub scanning direction) before and after an environmental fluctuation in the second embodiment. The solid line represents a characteristic (design value) before an environmental fluctuation, and the broken line represents a characteristic (effective value) when the temperature is elevated by 25° C.

From FIG. 7, an imaging position deviation caused by a wavelength difference of +5 nm is 40 $\mu$m (value when an image height with a landscape A3-size width of ±148.5 mm is measured) in the second embodiment, and corresponds to a pixel (position) deviation suppressed within about one pixel in, e.g., a printer having a resolution of 600 dpi. The initial wavelength deviation of the semiconductor laser 1

TABLE 2

Numerical Data of Second Embodiment
Design Data

| Wavelength, Refractive Index | | | Surface Shape of Toric Lens 63 | | | Surface Shape of Elongated Diffraction Element 64 | |
|---|---|---|---|---|---|---|---|
| Wavelength Used | $\lambda$ (nm) | 780 | First Surface | Second Surface | | First Surface | Second Surface |
| Refractive Index of Toric Lens 63 | ndt | 1.5831 | R  −8.19197E+01 | −4.59294E+01 | R | −3.36519E+02 | ∞ |
| ↑ Abbe Number | vdt | 30.2 | K  −9.39159E+00 | −1.67046E−00 | K | −5.60992E+01 | |
| Refractive Index of Elongated Diffraction Element 64 | ndd | 1.5831 | B4  8.03733E−07 | 2.46615E−07 | B4 | 1.82411E−07 | |
| ↑ Abbe Number | vdd | 30.2 | B6  1.33079E−11 | 3.16577E−10 | B6 | −1.66927E−11 | |
| Light Ray Angle | | | r  1.39988E+02 | −2.53499E+01 | B8 | 8.76950E−16 | |
| Angle of Incidence on Polygon | $\theta$p | −70.0 | D2s | 1.45874E−04 | B10 | −2.12681E−20 | |

| | | | | | Phase Function of Elongated Diffraction Element 64 | |
|---|---|---|---|---|---|---|
| | | | | | First Surface | Second Surface |
| Polygon Maximum Exit Angle | $\theta$e | 45.0 | D4s | 4.97782E−08 | | |
| | | | D6s | −1.80687E−12 | | |
| Layout | | | D2e | 2.18066E−04 | b2 | −5.04969E−03 |
| Polygon Surface - Toric Lens | e1 | 30.0 | D4e | −1.51822E−08 | b4 | 6.24030E−10 |
| Toric Lens Central Thickness | d1 | 11.0 | D6e | 3.43111E−11 | b6 | −7.31370E−14 |
| Toric Lens - Elongated Diffraction Element | e2 | 75.0 | | | d0 | −5.13677E−03 |
| Elongated Diffraction Element Central Thickness | d2 | 4.0 | | | d1 | 1.36210E−06 |
| Elongated Diffraction Element - Surface to be Scanned | Sk | 110.0 | | | d2 | 7.22724E−08 |
| Polygon Axis - Surface to be Scanned | L | 230.0 | | | d3 | −6.28966E−11 |
| Effective Scanning Width | W | 297.0 | | | d4 | 8.09090E−13 |

Suffices s indicate laser side
Suffices e indicate side opposite to laser
Y-axis sign + indicates side opposite to laser In the second embodiment, similar to the first embodiment, the power layout of the plastic toric lens 63 and composite optical element 64 can be appropriately set to compensate for both an imaging position variation caused by the wavelength variation of a semiconductor laser 1 in the main scanning direction and a focus variation caused by the environmental fluctuation (particularly temperature elevation) of the device in the sub scanning direction.

Power ratios of the refraction element 63 to the diffraction element 64 in the second embodiment are Main Scanning Direction: $\phi Lm/\phi Dm=13.0$ Sub Scanning Direction: $\phi Ls/\phi Ds=2.5$ These power ratios meet conditions (1) and (2).

FIG. 7 is a graph showing an imaging position variation in the main scanning direction caused by the wavelength between a plurality of colors, or mode hopping in activation is permitted by about 5 nm.

Similarly from FIG. 8, the focus movement amount in the sub scanning direction at a temperature elevated by 25° C. is 0.2 mm, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

The second embodiment compensates for all these environmental fluctuations using a plastic optical element. This can simultaneously reduce the manufacturing cost by molding and shorten the optical path by large-field-angle aberration correction using an aspherical surface.

As a characteristic feature unique to the second embodiment, the refraction element 63 is made of a material such as polycarbonate (PC) having a large dispersion. Therefore, the power of the diffraction element 64 can be relatively increased, which is effective in aberration correction and enables high-precision aberration correction.

As described above, the second embodiment uses the plastic toric lens 63 and composite optical element 64 as the scanning optical element 16 of the scanning optical device, and records images on a plurality of photosensitive drums by a plurality of scanning optical devices. A color image forming apparatus in which misregistration between colors caused by a wavelength fluctuation or environmental fluctuation, and density nonuniformity between colors are reduced can be implemented with a simple arrangement at low cost.

[Third Embodiment]

Figure 9:
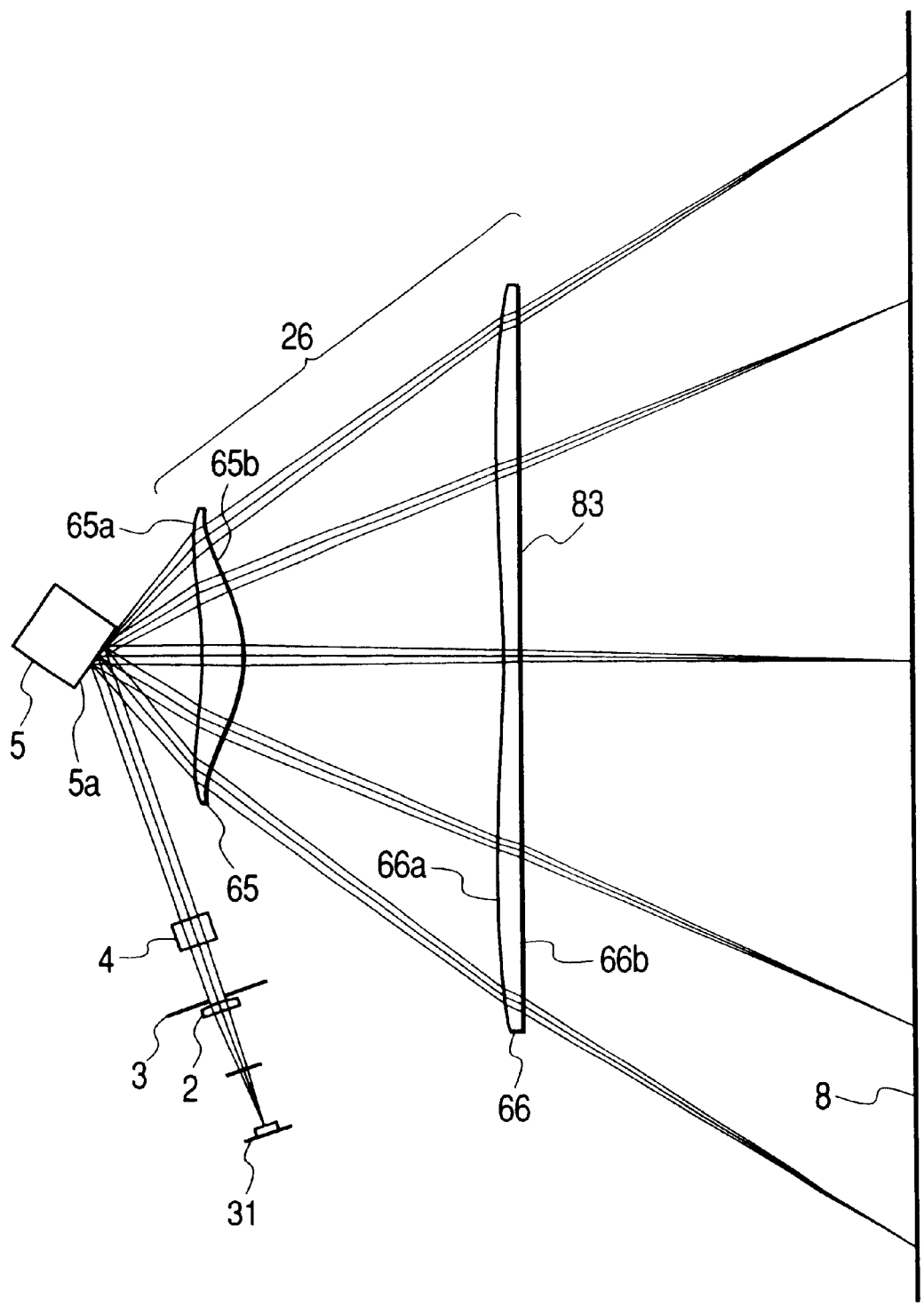
FIG. 9 is a sectional view showing the main part of the optical system of a scanning optical device constituting a color image forming apparatus in the main scanning direction according to the third embodiment of the present invention.

FIG. 9 is a sectional view of the main part of an optical system in the main scanning direction showing one of a plurality of scanning optical devices constituting a color image forming apparatus according to the third embodiment of the present invention, and a corresponding photosensitive drum. In FIG. 9, the same reference numerals as in FIG. 3 denote the same parts.

The third embodiment is different from the first embodiment in that a multi-semiconductor laser having a plurality of light-emitting portions (light-emitting points) is adopted as a light source means and that an imaging position deviation in the main scanning direction caused by the wavelength variation of the light source is compensated at embodiment), and emits a plurality of beams (only one beam is shown in FIG. 9) modulated independently.

A scanning optical element 26 as a third optical element (compensation means) having an f-θ characteristic has a refraction element 65 and diffraction element 66. The refraction element 65 is formed from a single plastic toric lens having different powers in the main scanning direction and sub scanning direction. Two lens surfaces 65a and 65b of the toric lens 65 in the main scanning direction are aspherical.

The diffraction element 66 is formed from an elongated composite optical element having different powers in the main scanning direction and sub scanning direction. An incident-side surface 66a of the composite optical element 66 is an aspherical surface having a predetermined power in only the main scanning direction (surface in the sub scanning direction is flat), whereas an exit-side surface 66b is a diffraction surface with a diffraction grating 83 added to a flat surface.

In the third embodiment, two beams emitted by the light source means 31 pass through the same path as in the first embodiment, and simultaneously scan a surface 8 in the sub scanning direction at a predetermined interval.

Table 3 shows the optical layout in the third embodiment, aspherical coefficients of the toric lens 65, and aspherical coefficients and phase terms of the composite optical element 66.

TABLE 3

Numerical Data of Third Embodiment
Design Data

| Wavelength, Refractive Index | | | Surface Shape of Toric Lens 65 | | | Surface Shape of Elongated Diffraction Element 66 | |
| --- | --- | --- | --- | --- | --- | --- | --- |
| Wavelength Used | λ (nm) | 780 | First Surface | Second Surface | | First Surface | Second Surface |
| Refractive Index of Toric Lens 65 | ndt | 1.5306 | R  −8.68542E+01 | −4.45747E+01 | R | −2.71881E+02 | ∞ |
| ↑ Abbe Number | vdt | 55.5 | K  −1.96906E+00 | 2.13828E−02 | K | −4.62791E+01 | |
| Refractive Index of Elongated Diffraction Element 66 | ndd | 1.5306 | B4  1.83024E−06 | 2.11836E−06 | B4 | 2.05587E−07 | |
| ↑ Abbe Number | vdd | 55.5 | B6  3.99262E−10 | 9.94640E−10 | B6 | −1.52060E−11 | |
| Light Ray Angle | | | B8  2.35548E−13 | 3.98293E−13 | B8 | 5.90567E−16 | |
| Angle of Incidence on Polygon | θp | −70.0 | B10 −4.32881E−17 | 2.55441E−16 | B10 | −1.28251E−20 | |

| | | | | | Phase Function of Elongated Diffraction Element 66 | |
| --- | --- | --- | --- | --- | --- | --- |
| | | | | | First Surface | Second Surface |
| Polygon Maximum Exit Angle | θe | 45.0 | r  3.36183E+02 | −2.14906E+01 | | |
| | | | D2s | 1.66335E−04 | | |
| Layout | | | D4s | −1.28177E−07 | b2 | −1.50000E−04 |
| Polygon Surface - Toric Lens | e1 | 30.0 | D6s | 1.39166E−10 | b4 | 1.08606E−08 |
| Toric Lens Central Thickness | d1 | 11.0 | D2e | 2.19201E−04 | b6 | −6.03566E−13 |
| Toric Lens - Elongated Diffraction Element | e2 | 71.9 | D4e | −1.59583e−07 | d0 | −5.03940E−03 |
| Elongated Diffraction Element Central Thickness | d2 | 4.0 | D6e | 1.52979e−10 | d1 | 1.53717E−06 |
| Elongated Diffraction Element - Surface to be Scanned | Sk | 109.8 | | | d2 | 5.44808E−08 |
| Polygon Axis - Surface to be Scanned | L | 226.7 | | | d3 | −8.67550E−11 |
| Effective Scanning Width | W | 297.0 | | | d4 | 2.98778E−12 |

Suffices s indicate laser side
Suffices e indicate side opposite to laser
Y-axis sign + indicates side opposite to laser high precision along with this change. The remaining arrangement and optical operation are almost the same as in the first embodiment, and provide the same effects.

In FIG. 9, a light source means 31 is formed from a multi-semiconductor laser (multi-beam laser source) having a plurality of light-emitting portions (two in the third In the third embodiment, similar to the first and second embodiments, the power layout of the plastic toric lens 65 and composite optical element 66 can be appropriately set to compensate for both an imaging position variation caused by the wavelength fluctuation of the multi-semiconductor laser 31 in the main scanning direction and a focus variation caused by the environmental fluctuation (particularly temperature elevation) of the device in the sub scanning direction. Moreover, the third embodiment can also compensate for a scanning interval variation (jitter) in the main scanning direction on the photosensitive drum surface 8 caused by the wavelength difference between a plurality of light-emitting portions.

Power ratios of the refraction element 65 to the diffraction element 66 in the third embodiment are Main Scanning Direction: $\phi Lm/\phi Dm=17.0$ Sub Scanning Direction: $\phi Ls/\phi Ds=2.5$ These power ratios meet conditions (1) and (2).

Figure 10:
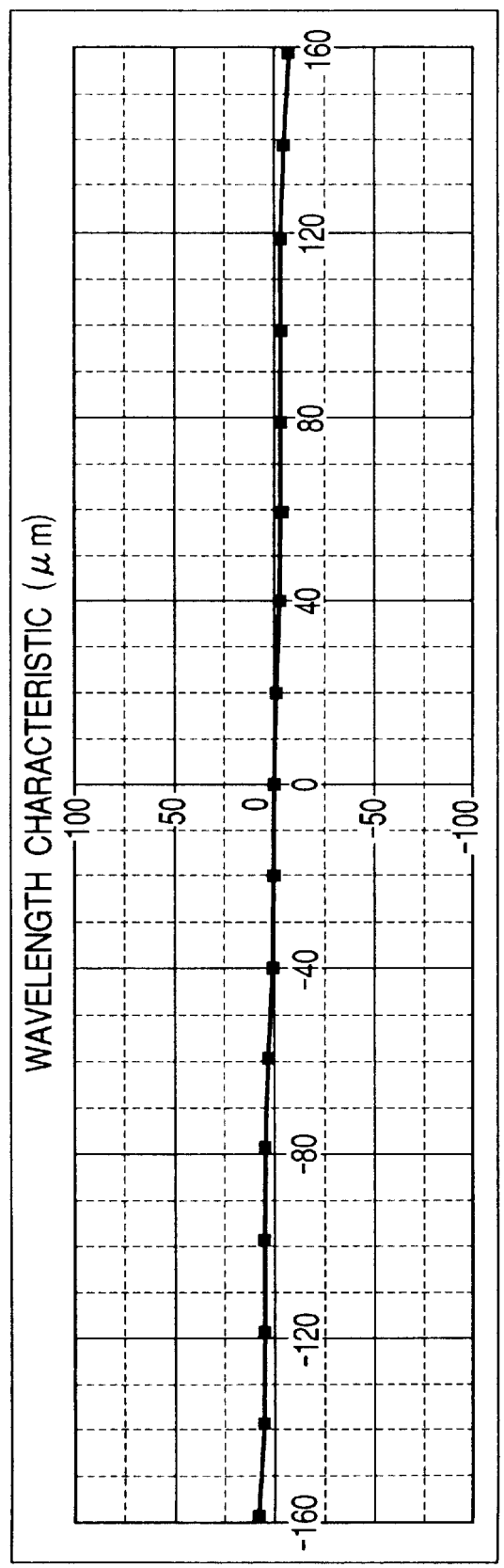
FIG. 10 is a graph showing an imaging position variation in the main scanning direction caused by a wavelength variation in the third embodiment of the present invention.

FIG. 10 is a graph showing an imaging position variation in the main scanning direction caused by the wavelength variation of the multi-semiconductor laser 31 in the third embodiment. FIG. 10 shows a difference (5 nm) from the initial wavelength of the multi-semiconductor laser 31.

Figure 11:
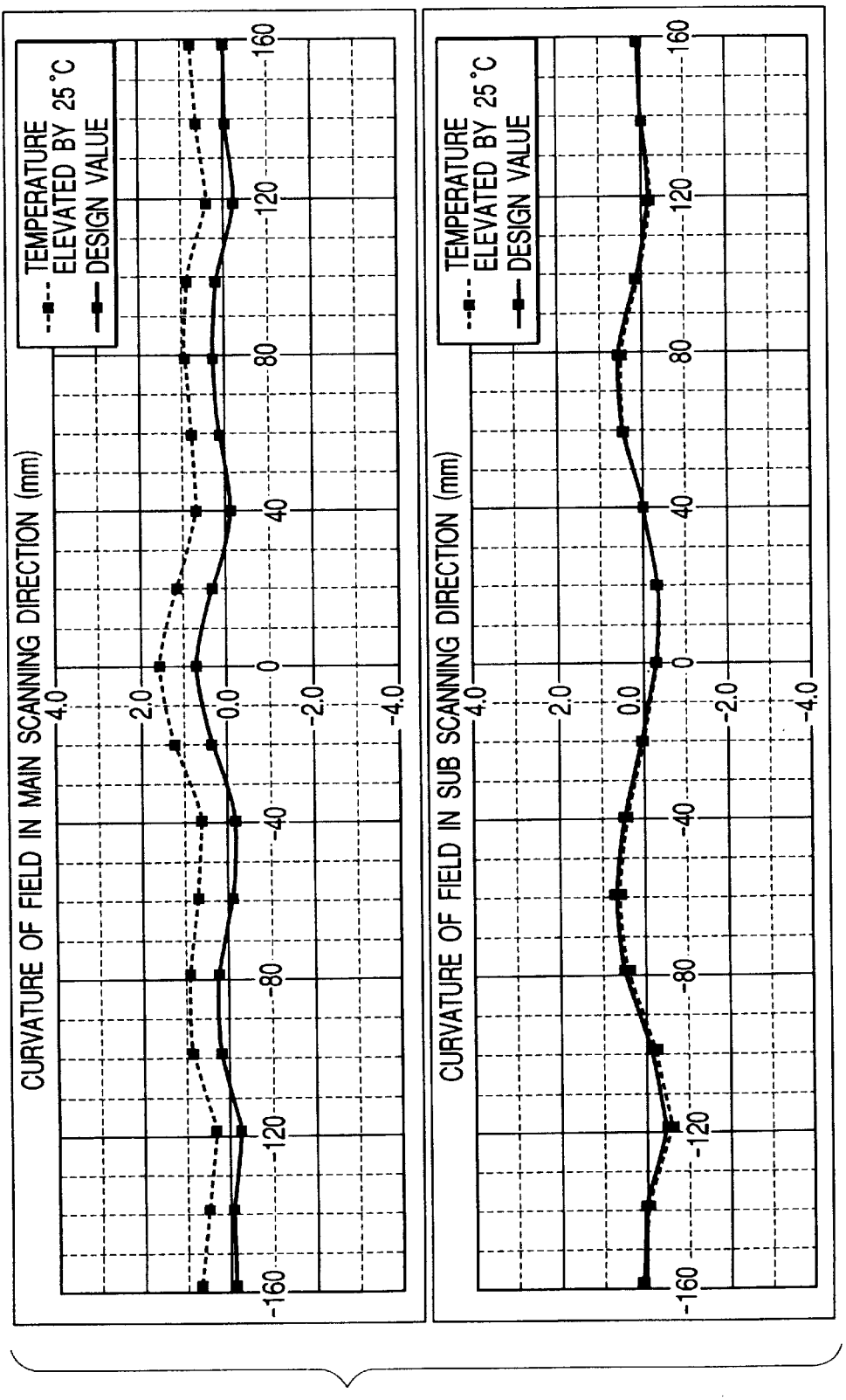
FIG. 11 is a graph showing an imaging position variation in the main scanning direction caused by a wavelength variation in the third embodiment of the present invention.

FIG. 11 is a graph showing paraxial aberration (curvature of field in the main scanning direction and sub scanning direction) before and after an environmental fluctuation in the third embodiment. The solid line represents a characteristic (design value) before an environmental fluctuation, and the broken line represents a characteristic (effective value) when the temperature is elevated by 25° C.

From FIG. 10, an imaging position deviation caused by a wavelength difference of +5 nm is 11 μm in the third embodiment, and corresponds to a pixel (position) deviation suppressed within about ¼ pixel in, e.g., a printer having a resolution of 600 dpi. The initial wavelength deviation of the multi-semiconductor laser between a plurality of colors, the initial wavelength deviation between a plurality of light-emitting portions, or mode hopping in activation is permitted by about 5 nm.

Similarly from FIG. 11, the focus movement amount in the sub scanning direction at a temperature elevated by 25° C. is 0.2 mm, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

The third embodiment compensates for all these environmental fluctuations using a plastic optical element. This can simultaneously reduce the manufacturing cost by molding and shorten the optical path by large-field-angle aberration correction using an aspherical surface.

As a characteristic feature unique to the third embodiment, the chromatic aberration of magnification (imaging position variation in the main scanning direction) caused by the wavelength fluctuation of the multi-semiconductor laser 31 is corrected at higher precision. Jitter caused by the wavelength difference between a plurality of light-emitting portions can also be reduced.

As described above, the third embodiment uses the plastic toric lens 65 and composite optical element 66 as the scanning optical element 26 of the scanning optical device, and records images on a plurality of photosensitive drums by a plurality of scanning optical devices. A color image forming apparatus in which jitter in the use of the multi-semiconductor laser is suppressed, and misregistration between colors caused by a wavelength fluctuation or environmental fluctuation, and density nonuniformity between colors are reduced can be implemented with a simple arrangement at low cost.

In each embodiment, a focus position variation in the sub scanning direction on a surface to be scanned that is caused by the environmental fluctuation of the device is compensated by the power variation of the refraction element and diffraction element and the wavelength variation of the light source means. As a matter of course, a focus position variation in the main scanning direction on a surface to be scanned that is caused by an environmental fluctuation is also compensated by the power variation of the refraction element and diffraction element and the wavelength variation of the light source means.

[Fourth Embodiment]

Figure 12:
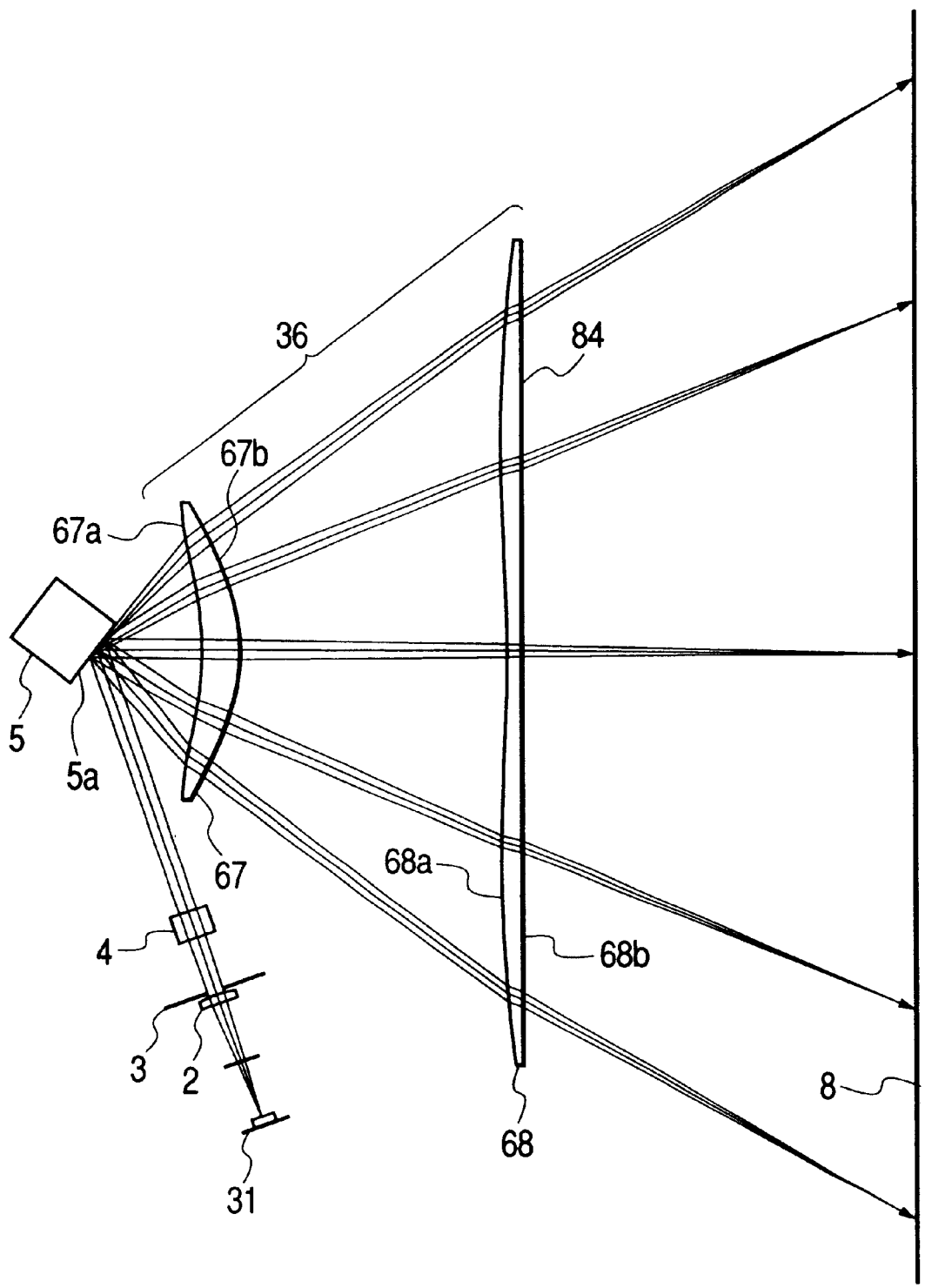
FIG. 12 is a sectional view showing the main part of the optical system of a scanning optical device constituting a color image forming apparatus in the main scanning direction according to the fourth embodiment of the present invention.

FIG. 12 is a sectional view (sectional view of main scanning) of the main part of an optical system showing one of a plurality of scanning optical devices constituting a color image forming apparatus in the main scanning direction according to the fourth embodiment of the present invention, and a corresponding photosensitive drum. In FIG. 12, the same reference numerals as in FIG. 3 denote the same parts.

The fourth embodiment is different from the first embodiment in that a multi-semiconductor laser (multi-beam laser source) having a plurality of light-emitting portions (light-emitting points) is adopted as a light source means, that the power ratio of the refraction element to diffraction element of a scanning optical element (third optical element) is appropriately set to compensate for an aberration variation along with an environmental fluctuation, and that an imaging position deviation caused by a wavelength variation not accompanied by any environmental fluctuation is set to a desired value or less. The remaining arrangement and optical action are almost the same as in the first embodiment, and provide the same effects.

In FIG. 12, a scanning optical element 36 as a third optical element having an f-θ characteristic has a refraction element 67 and diffraction element 68. The refraction element 67 is formed from a single plastic toric lens having different powers in the main scanning direction and sub scanning direction. Two lens surfaces 67a and 67b of the toric lens 67 in the main scanning direction are aspherical.

The diffraction element 68 is formed from an elongated composite optical element having different powers in the main scanning direction and sub scanning direction. An incident-side surface 68a of the composite optical element 68 is an aspherical surface having a predetermined power in only the main scanning direction (surface in the sub scanning direction is flat), whereas an exit-side surface 68b is a diffraction surface with a diffraction grating 84 added to a flat surface.

In the fourth embodiment, the power layout of the plastic toric lens 67 and composite optical element 68 is appropriately set. In the main scanning direction, an imaging position deviation caused by a wavelength variation along with an environmental fluctuation, and an imaging position deviation caused by the refractive index variation of the material of the scanning optical element are set to opposite directions at the two ends of an effective image region (effective scanning region). In the sub scanning direction, a focus variation caused by an environmental fluctuation is compensated.

Note that the environmental fluctuation means the temperature variation of the scanning optical device determined by self-temperature elevation in the scanning optical device, heat generation from another building component (fixing unit or the like) in the image forming apparatus, or an atmospheric variation at the installation location of the image forming apparatus.

In the fourth embodiment, the chromatic aberration of magnification of the entire scanning optical element 36 is compensated by excessive correction in the main scanning direction by the refraction element 67 having a positive dispersion and the diffraction element 68 having a negative dispersion. The reason of slightly excessively correcting the chromatic aberration of magnification is to change a wavelength variation along with the above-mentioned environmental fluctuation and an imaging position variation in the main scanning direction caused by a refractive index variation to directions in which these variations cancel each other. This increases the refracting power in the scanning optical system, and enhances the aberration correction effect by the diffraction element.

Letting $\phi Lm$ be the power of the refraction element 67 in the main scanning direction, $vL$ be the Abbe number of the material of the refraction element 68, $\phi Dm$ be the power of the diffraction element 68 in the main scanning direction, and $vD$ be the Abbe number of the material of the diffraction element 68, the power layout desirably satisfies $$\phi Lm/vL + \phi Dm/vD \leq 0$$

The Abbe number has a limited range of values. The Abbe number is $20 \leq vL \leq 70$ as the distribution range of a general plastic material or glass material for the refraction element 67, and $vD = -3.45$ for the diffraction element 68 regardless of its material. The power ratio of the refraction element 67 to the diffraction element 68 in the main scanning direction desirably satisfies a condition:

$$vL/(2 \times 3.45) \leq \phi Lm/\phi Dm \leq vL/3.45$$

$$\therefore vL/6.90 \leq \phi Lm/\phi Dm \leq vL/3.45 \quad (3)$$

If, however, the chromatic aberration of magnification is corrected too excessively, the imaging position in the main scanning direction varies due to a variation such as the initial wavelength deviation of the multi-semiconductor laser not accompanied by any environmental fluctuation, a discrete wavelength variation by mode hopping, or the wavelength deviation between a plurality of light sources of the multi-semiconductor laser. In particular, a wavelength variation by mode hopping of the multi-semiconductor laser is a discrete variation with high visibility. For this reason, an imaging position variation in the main scanning direction per unit mode hopping must be set to 3 $\mu$m or less at the two ends of the effective image region.

As will be described later, the fourth embodiment solves this problem by setting an imaging position variation in the main scanning direction per unit mode hopping of the multi-semiconductor laser to 3 $\mu$m or less at the two ends of the effective image region.

The mode hopping means a shift of an optical output from a laser during single-mode oscillation from a given longitudinal mode to another longitudinal mode. "Per unit mode hopping" means "per wavelength variation" caused by a change to an adjacent mode.

In the sub scanning direction, similar to the first embodiment, the refractive index variation of the scanning optical element caused by the environmental fluctuation (particularly temperature elevation) of the scanning optical device is compensated by the wavelength variation of the multi-semiconductor laser caused by a similar environmental fluctuation, thereby canceling focus movement (temperature compensation). A refractive index variation $dn/dt$ and wavelength variation $d\lambda/dt$ per unit temperature are set to $$dn/dt = -1.0E-4/^\circ C.$$

$$d\lambda/dt = 0.255 \text{ nm}/^\circ C.$$

Considering the refractive index of the material of the refraction element 67, and the possible value of the Abbe number, the power layout is desirably set to $$1.0 \leq \phi Ls/\phi Ds \leq 2.6 \quad (2)$$

where $\phi Ls$: power of the refraction element in the sub scanning direction $\phi Ds$: power of the diffraction element in the sub scanning direction Table 4 shows the optical layout in the fourth embodiment, aspherical coefficients of the toric lens 67, and aspherical coefficients and phase terms of the composite optical element 68.

TABLE 4

Numerical Data of Fourth Embodiment
Design Data

| Wavelength, Refractive Index | | | Surface Shape of Toric Lens 67 | | | Surface Shape of Elongated Diffraction Element 68 | | |
|---|---|---|---|---|---|---|---|---|
| Wavelength Used | λ (nm) | 780 | | First Surface | Second Surface | | First Surface | Second Surface |
| Refractive Index of Toric Lens 67 | ndt | 1.5306 | R | −8.37256E+01 | −4.46398E+01 | R | −3.27422E+02 | ∞ |
| ↑ Abbe Number | vdt | 55.5 | K | −8.85666E+00 | −5.33951E−01 | K | −8.52087E+01 | |
| Refractive Index of Elongated Diffraction Element 68 | ndd | 1.5306 | B4 | 9.81713E−07 | 1.65579E−06 | B4 | 1.59236E−07 | |
| ↑ Abbe Number | vdd | 55.5 | B6 | −5.17945E−11 | 3.79299E−10 | B6 | −1.10765E−11 | |
| Light Ray Angle | | | r | 1.25787E+02 | −2.33970E+01 | B8 | 3.70722E−16 | |
| Angle of Incidence on Polygon | θp | −70.0 | D2s | | 1.42600E−04 | B10 | −4.86087E−21 | |

| | | | | | | Phase Function of Elongated Diffraction Element 68 | | |
|---|---|---|---|---|---|---|---|---|
| | | | | | | | First Surface | Second Surface |
| Polygon Maximum Exit Angle | θe | 45.0 | D4s | | 5.10858E−08 | | | |
| | | | D6s | | 3.98672E−13 | | | |
| Layout | | | D2e | | 2.14316E−04 | b2 | | −1.72316E−04 |
| Polygon Surface - Toric Lens | e1 | 30.0 | D4e | | −1.22319E−08 | b4 | | 1.61040E−09 |
| Toric Lens Central Thickness | d1 | 11.0 | D6e | | 3.61202E−11 | b6 | | −1.12978E−13 |

TABLE 4-continued

Numerical Data of Fourth Embodiment
Design Data

| | | | | | |
|---|---|---|---|---|---|
| Toric Lens - Elongated Diffraction Element | e2 | 75.0 | d0 | −5.10910E−03 |
| Elongated Diffraction Element Central Thickness | d2 | 4.0 | d1 | 1.35226E−06 |
| Elongated Diffraction Element - Surface to be Scanned | Sk | 110.0 | d2 | 6.65427E−08 |
| Polygon Axis - Surface to be Scanned | L | 230.0 | d3 | −6.20669E−11 |
| Effective Scanning Width | W | 297.0 | d4 | 1.01220E−12 |

Suffices s indicate laser side
Suffices e indicate side opposite to laser
Y-axis sign + indicates side opposite to laser Power ratios of the refraction element 67 to the diffraction element 68 in the fourth embodiment are Main Scanning Direction: $\phi Lm/\phi Dm=14.7$ Sub Scanning Direction: $\phi Ls/\phi Ds=2.5$ These power ratios meet excessive correction of the chromatic aberration of magnification and temperature compensation, i.e., conditions (3) and (2).

Figure 13:
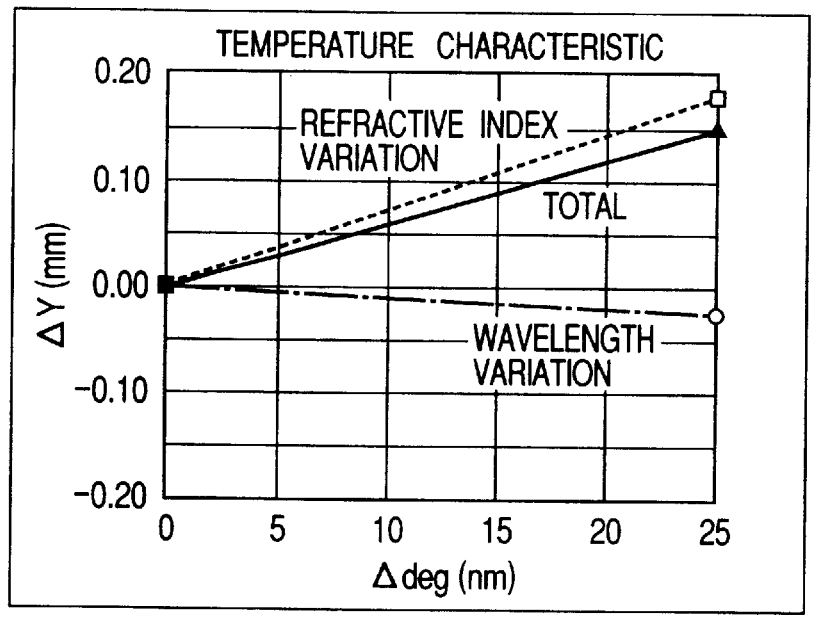
FIG. 13 is a graph showing the imaging position deviation of the most off-axis beam caused by temperature elevation in the fourth embodiment of the present invention.

FIG. 13 is a graph showing an imaging position deviation at the end of the effective image region (most off-axis beam) when the scanning optical device in the fourth embodiment is elevated from room temperature (design temperature). The dotted line represents a component generated upon a decrease in the refractive index of the material of the scanning optical element along with temperature elevation. The chain line represents a component generated upon the wavelength variation of the multi-semiconductor laser along with temperature elevation. The solid line represents an imaging position deviation caused by temperature elevation as the total of these components, both of which are deviation amounts from the design temperature. At a temperature elevated by 25° C., the wavelength of the light source increases by dλ=6.375 nm from the reference wavelength, and the refractive index of the scanning optical element decreases by dn=0.0025.

From FIG. 13, excessive correction of the chromatic aberration of magnification changes the wavelength variation and refractive index variation of an imaging position deviation in opposite directions, i.e., directions in which the imaging position deviation by temperature elevation is canceled.

Figure 14:
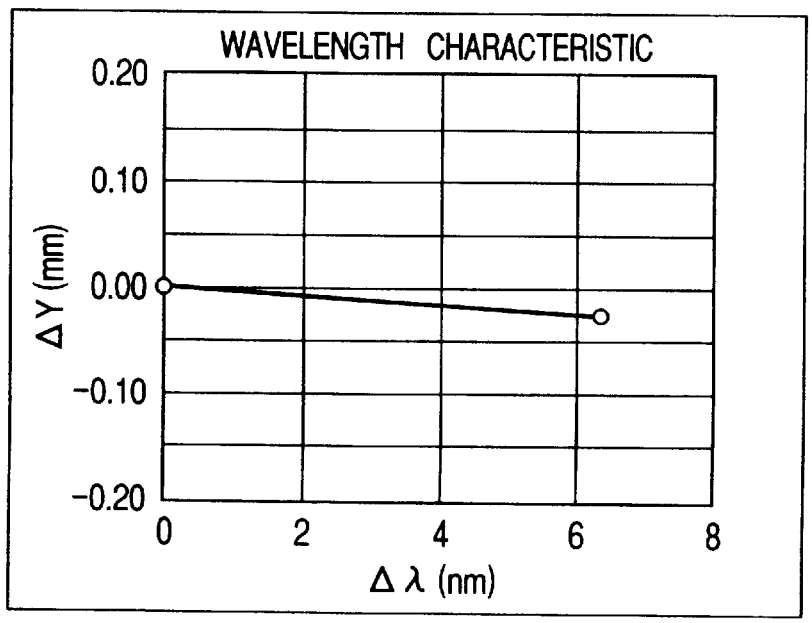
FIG. 14 is a graph showing the imaging position deviation of the most off-axis beam upon a wavelength variation not accompanied by temperature elevation in the fourth embodiment of the present invention.

FIG. 14 is a graph showing an imaging position deviation as a function of a wavelength variation not accompanied by temperature elevation at the end of the effective image region (most off-axis beam). FIG. 14 shows a deviation amount from the reference wavelength.

From FIG. 14, an imaging position deviation in the main scanning direction per unit mode hopping (0.3 nm in the multi-semiconductor laser of the fourth embodiment) is about 1.3 μm which is substantially negligible with respect to a discrete wavelength variation.

Figure 15:
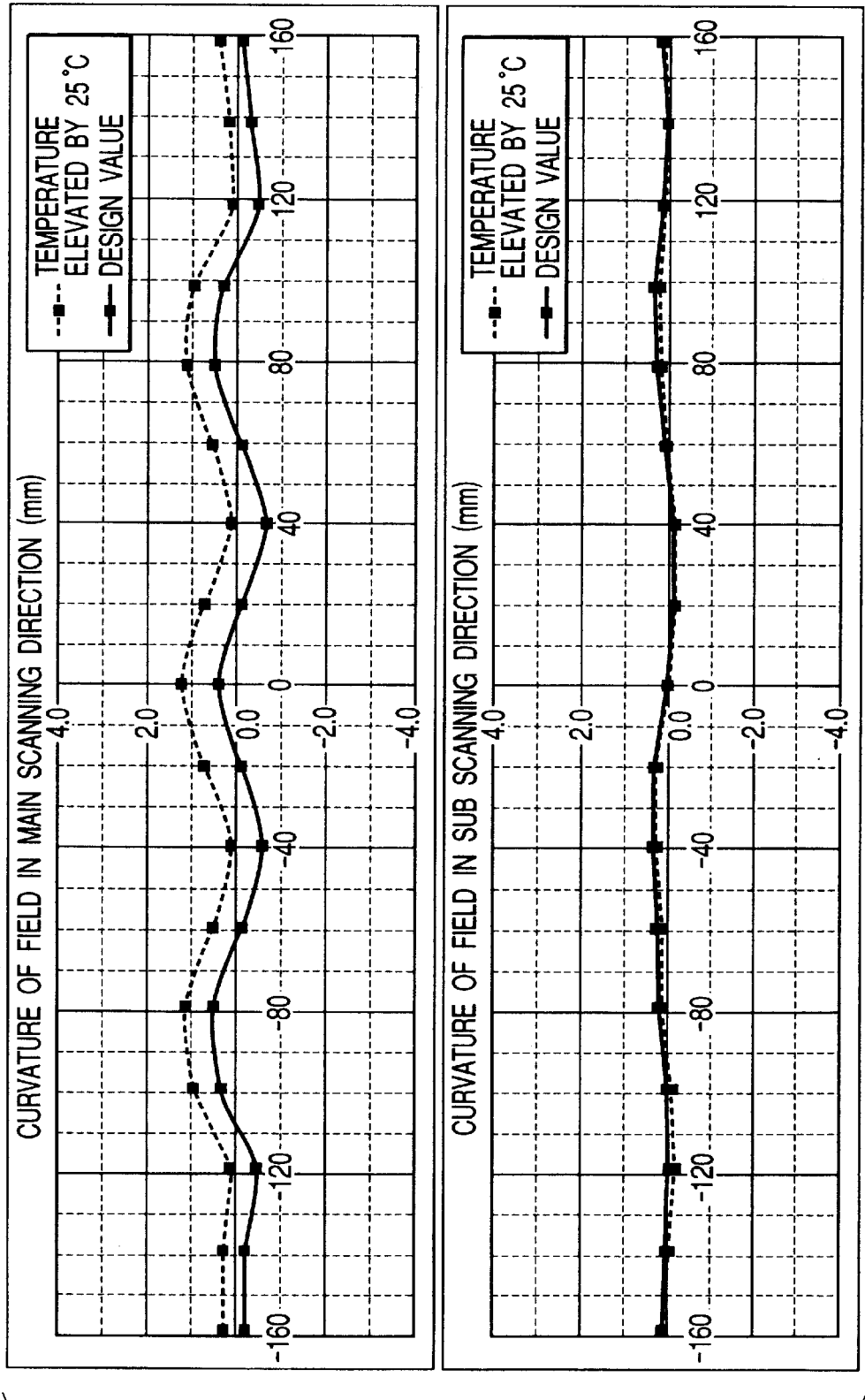
FIG. 15 is a graph showing an imaging position variation in the main scanning direction caused by a wavelength variation in the fourth embodiment of the present invention.

FIG. 15 is a graph showing paraxial aberration (focus position in the main scanning direction and sub scanning direction) before and after an environmental fluctuation in the fourth embodiment. The solid line represents a characteristic (design value) before an environmental fluctuation, and the broken line represents a characteristic (effective value) when the temperature of the scanning optical device is elevated by 25° C.

Generally in an apparatus which forms a color image by recording pieces of image information of respective colors on a plurality of photosensitive drums by a plurality of scanning optical devices, focus deviations in the main scanning direction and sub scanning direction caused by an environmental fluctuation must be suppressed to ±1.0 mm or less in order that misregistration between colors and image density nonuniformity between colors may be visually inconspicuous.

From FIG. 15, the focus movement amount in the sub scanning direction at a temperature elevated by 25° C. is 0.2 mm in the fourth embodiment, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

The fourth embodiment compensates for all these environmental fluctuations using a plastic optical element. This can simultaneously reduce the manufacturing cost by molding and shorten the optical path by large-field-angle aberration correction using an aspherical surface.

As described above, the fourth embodiment appropriately sets the powers of the refraction element and diffraction element as the scanning optical element of the scanning optical device such that an imaging position deviation in the main scanning direction caused by a wavelength variation along with an environmental fluctuation, and an imaging position deviation caused by the refractive index variation of the material of the scanning optical element are set to opposite directions at the two ends of the effective image region, thereby reducing an imaging position deviation caused by an environmental fluctuation. At the same time, an imaging position deviation caused by a wavelength variation not accompanied by any environmental fluctuation is also set to a desired value or less, thereby implementing a scanning optical device resistant to a wavelength fluctuation or environmental fluctuation.

As described above, the fourth embodiment uses a plurality of scanning optical devices to record images on a plurality of photosensitive drum surfaces. A color image forming apparatus in which misregistration between colors caused by a wavelength fluctuation or environmental fluctuation, and density nonuniformity between colors are reduced can be implemented with a simple arrangement at low cost.

Note that the fourth embodiment has exemplified the use of a multi-beam laser source for a tandem type color image forming apparatus whose precision requirement is the highest. However, this embodiment is effective regardless of the type of scanning optical device such as a color/monochrome device or a single-beam laser source/multi-beam laser source.

[Fifth Embodiment]

Figure 16:
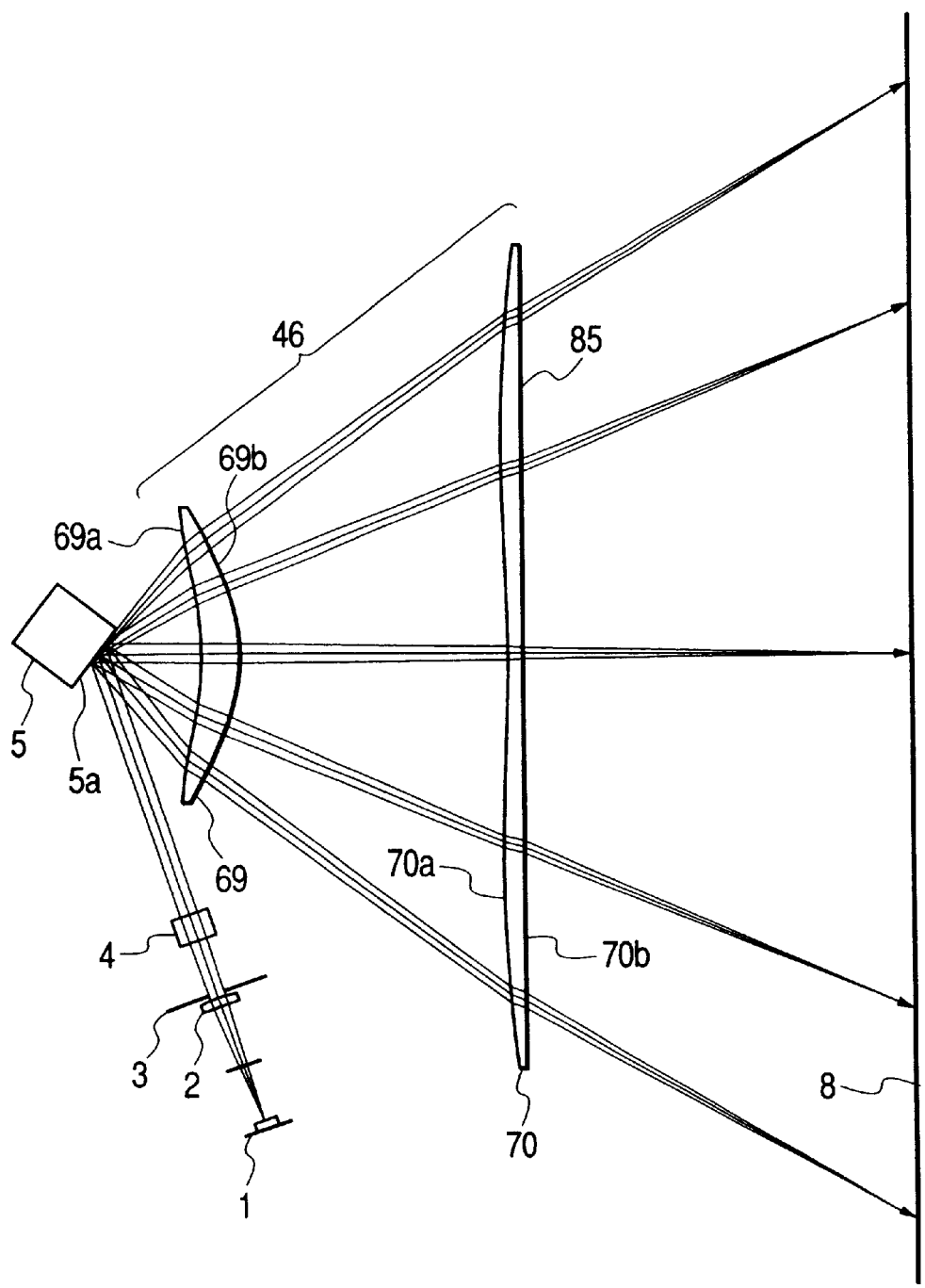
FIG. 16 is a sectional view showing the main part of the optical system of a scanning optical device constituting a color image forming apparatus in the main scanning direction according to the fifth embodiment of the present invention.

FIG. 16 is a sectional view (sectional view of main scanning) of the main part of an optical system showing one of a plurality of scanning optical devices constituting a color image forming apparatus in the main scanning direction according to the fifth embodiment of the present invention, and a corresponding photosensitive drum. In FIG. 16, the same reference numerals as in FIG. 12 denote the same parts.

The fifth embodiment is different from the fourth embodiment in that a semiconductor laser (single-beam laser source) having a single light-emitting portion is used as a light source means, and that the power ratio of the refraction element to diffraction element of the scanning optical element is optimized. The remaining arrangement and optical action are almost the same as in the fourth embodiment, and provide the same effects.

In FIG. 16, a scanning optical element 46 as a third optical element having an f-θ characteristic has a refraction element 69 and diffraction element 70. The refraction element 69 is formed from a single plastic toric lens having different powers in the main scanning direction and sub scanning direction. Two lens surfaces 69a and 69b of the toric lens 69 in the main scanning direction are aspherical.

The diffraction element 70 is formed from an elongated composite optical element having different powers in the main scanning direction and sub scanning direction. An incident-side surface 70a of the composite optical element 70 is an aspherical surface having a predetermined power in only the main scanning direction (surface in the sub scanning direction is flat), whereas an exit-side surface 70b is a diffraction surface with a diffraction grating 85 added to a flat surface.

Table 5 shows the optical layout in the fifth embodiment, aspherical coefficients of the toric lens 69, and aspherical coefficients and phase terms of the composite optical element 70.

TABLE 5

Numerical Data of Fifth Embodiment
Design Data

| Wavelength, Refractive Index | | | Surface Shape of Toric Lens 69 | | | Surface Shape of Elongated Diffraction Element 70 | | |
| --- | --- | --- | --- | --- | --- | --- | --- | --- |
| Wavelength Used | λ (nm) | 780 | | First Surface | Second Surface | | First Surface | Second Surface |
| Refractive Index of Toric Lens 69 | ndt | 1.5306 | R | −8.53751E+01 | −4.55667E+01 | R | −3.43494E+02 | ∞ |
| ↑ Abbe Number | vdt | 55.5 | K | 2.24374E−01 | −8.11042E−01 | K | −4.10368E+01 | |
| Refractive Index of Elongated Diffraction Element 70 | ndd | 1.5306 | B4 | 1.94226E−06 | 6.82494E−07 | B4 | 2.14788E−07 | |
| ↑ Abbe Number | vdd | 55.5 | B6 | 8.04096E−10 | 5.53491E−10 | B6 | −1.99348E−11 | |
| Light Ray Angle | | | B8 | −6.69880E−13 | 4.54457E−13 | B8 | 1.07627E−15 | |
| Angle of Incidence on Polygon | θp | −70.0 | B10 | 1.00167E−16 | −3.02377E−16 | B10 | −2.82629E−20 | |

| | | | | | | Phase Function of Elongated Diffraction Element 70 | |
| --- | --- | --- | --- | --- | --- | --- | --- |
| | | | | | | First Surface | Second Surface |
| Polygon Maximum Exit Angle | θe | 45.0 | r | 1.25791E+02 | −2.35075E+01 | | |
| | | | D2s | | 1.42836E−04 | | |
| Layout | | | D4s | | 4.11761E−08 | b2 | −2.80000E−04 |
| Polygon Surface - Toric Lens | e1 | 30.0 | D6s | | 7.72220E−12 | b4 | 1.06258E−08 |
| Toric Lens Central Thickness | d1 | 11.0 | D2e | | 2.17519E−04 | b6 | −1.41997E−12 |
| Toric Lens - Elongated Diffraction Element | e2 | 75.0 | D4e | | −3.46459E−08 | b8 | 1.14984E−16 |
| Elongated Diffraction Element Central Thickness | d2 | 5.0 | D6e | | 5.36631E−11 | b10 | −4.39247E−21 |
| Elongated Diffraction Element - Surface to be Scanned | Sk | 110.0 | | | | d0 | −5.11279E−03 |
| Polygon Axis - Surface to be Scanned | L | 232.0 | | | | d1 | 1.32455E−06 |
| Effective Scanning Width | W | 297.0 | | | | d2 | 6.53368E−08 |
| | | | | | | d3 | −5.97665E−11 |
| | | | | | | d4 | 1.11649E−12 |

Suffices s indicate laser side
Suffices e indicate side opposite to laser
Y-axis sign + indicates side opposite to laser In the fifth embodiment, similar to the fourth embodiment, the power layout of the plastic toric lens 69 and composite optical element 70 is appropriately set. In the main scanning direction, an imaging position variation caused by a wavelength variation along with an environmental fluctuation, and an imaging position deviation caused by the refractive index variation of the material of the scanning optical element are set to opposite directions at the two ends of the effective image region. In the sub scanning direction, a focus variation caused by an environmental fluctuation is compensated.

Power ratios of the refraction element 69 to the diffraction element 70 in the fifth embodiment are Main Scanning Direction: φLm/φDm=8.8

Sub Scanning Direction: φLs/φDs=2.5

These power ratios meet excessive correction of the chromatic aberration of magnification and temperature compensation, i.e., conditions (3) and (2).

Figure 17:
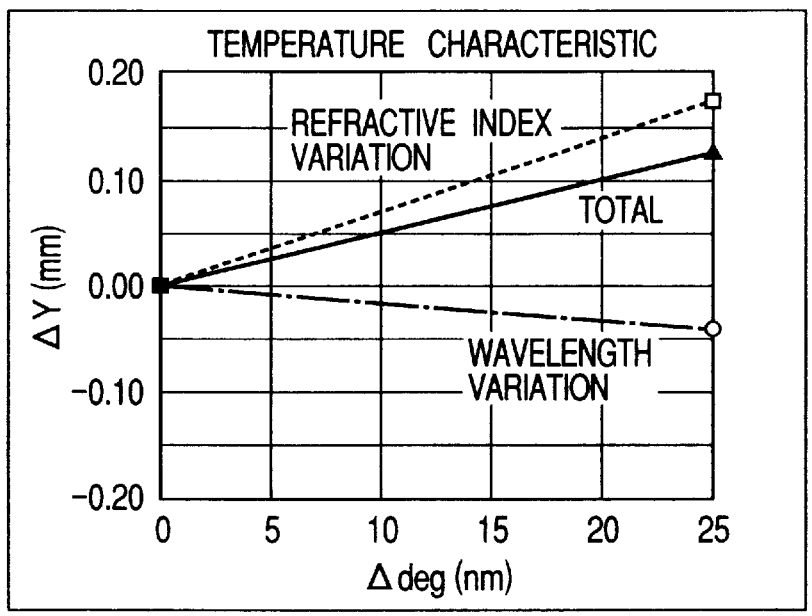
FIG. 17 is a graph showing the imaging position deviation of the most off-axis beam caused by temperature elevation in the fifth embodiment of the present invention.

FIG. 17 is a graph showing an imaging position deviation at the end of the effective image region (most off-axis beam) when the scanning optical device in the fifth embodiment is elevated from room temperature (design temperature). The dotted line represents a component generated upon a decrease in the refractive index of the material of the scanning optical element along with temperature elevation. The chain line represents a component generated upon the wavelength variation of the semiconductor laser along with temperature elevation. The solid line represents an imaging position deviation caused by temperature elevation as the total of these components, both of which are deviation amounts from the design temperature. At a temperature elevated by 25° C., the wavelength of the light source increases by dλ=6.375 nm from the reference wavelength, and the refractive index of the scanning optical element decreases by dn=0.0025.

From FIG. 17, excessive correction of the chromatic aberration of magnification changes the wavelength variation and refractive index variation of an imaging position deviation in opposite directions, i.e., directions in which the imaging position deviation by temperature elevation is canceled. In particular, the fifth embodiment relatively increases the power of the diffraction element, thereby increasing an imaging position deviation caused by the wavelength variation of the semiconductor laser along with temperature elevation, and enhancing the correction effect together with a component generated upon a decrease in the refractive index of the material of the scanning optical element.

Figure 18:
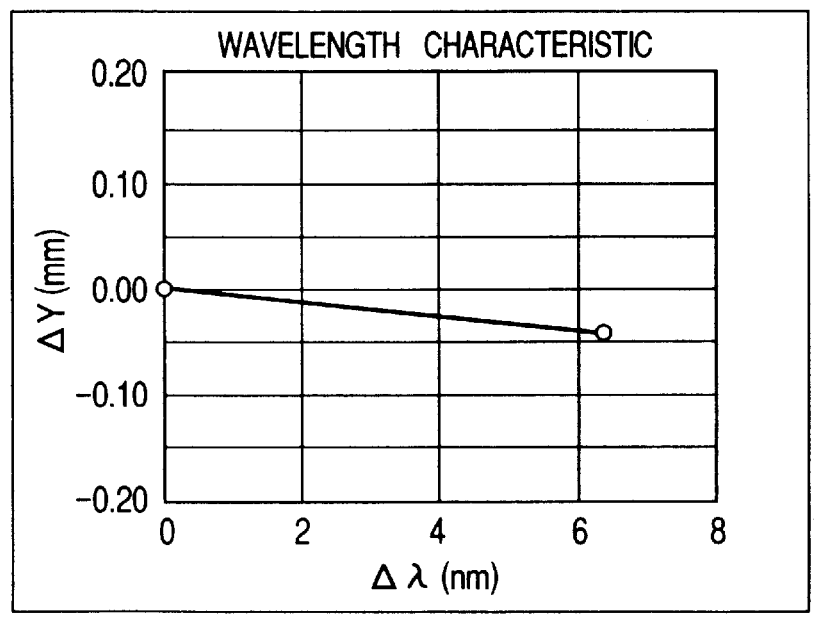
FIG. 18 is a graph showing the imaging position deviation of the most off-axis beam upon a wavelength variation not accompanied by temperature elevation in the fifth embodiment of the present invention.

FIG. 18 is a graph showing an imaging position deviation as a function of a wavelength variation not accompanied by temperature elevation at the end of the effective image region (most off-axis beam). FIG. 18 shows a deviation amount from the reference wavelength.

From FIG. 18, an imaging position deviation in the main scanning direction per unit mode hopping (0.3 nm in the semiconductor laser of the fifth embodiment) is about 2.0 μm which is substantially negligible with respect to a discrete wavelength variation.

Figure 19:
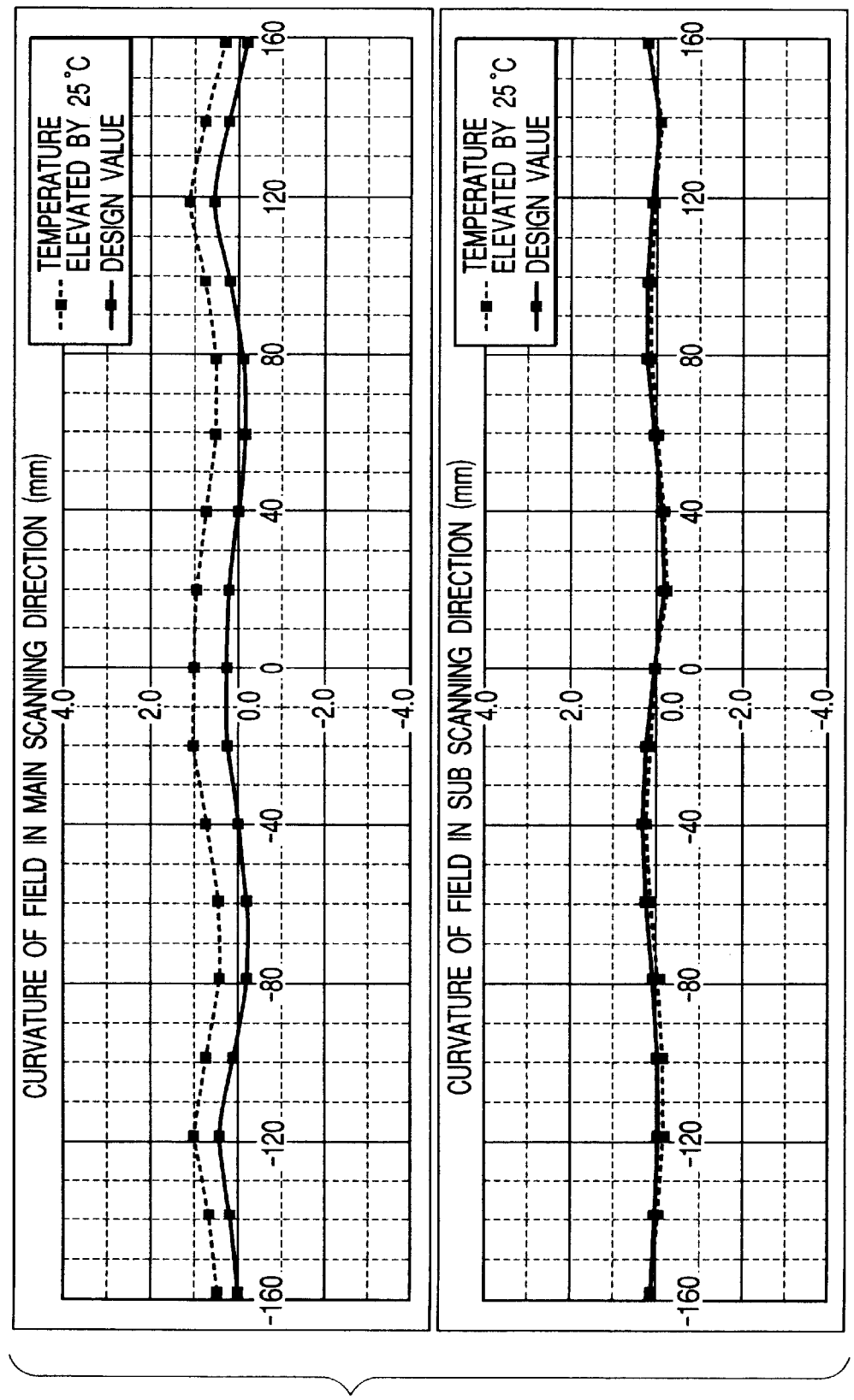
FIG. 19 is a graph showing an imaging position variation in the main scanning direction caused by a wavelength variation in the fifth embodiment of the present invention.

FIG. 19 is a graph showing paraxial aberration (focus position in the main scanning direction and sub scanning direction) before and after an environmental fluctuation in the fifth embodiment. The solid line represents a characteristic (design value) before an environmental fluctuation, and the broken line represents a characteristic (effective value) when the temperature of the scanning optical device is elevated by 25° C.

From FIG. 19, the focus movement amount in the sub scanning direction at a temperature elevated by 25° C. is 0.2 mm in the fifth embodiment, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

As described above, the fifth embodiment appropriately sets the powers of the refraction element and diffraction element as the scanning optical element of the scanning optical device such that an imaging position deviation in the main scanning direction caused by a wavelength variation along with an environmental fluctuation, and an imaging position deviation caused by the refractive index variation of the material of the scanning optical element are set to opposite directions at the two ends of the effective image region, thereby reducing an imaging position deviation caused by an environmental fluctuation. At the same time, an imaging position deviation caused by a wavelength variation not accompanied by any environmental fluctuation is also set to a desired value or less, thereby implementing a scanning optical device resistant to a wavelength variation or environmental variation. Especially in this embodiment, the power of the diffraction element is relatively increased to increase an imaging position deviation caused the wavelength variation of the semiconductor laser along with temperature elevation and to enhance the correction effect together with a component generated upon a decrease in the refractive index of the material of the scanning optical element. A scanning optical device more resistant to an environmental variation is implemented.

As described above, the fifth embodiment uses a plurality of scanning optical devices to record images on a plurality of photosensitive drum surfaces. A color image forming apparatus in which misregistration between colors caused by a wavelength fluctuation or environmental fluctuation, and density nonuniformity between colors are reduced can be implemented with a simple arrangement at low cost.

[Sixth Embodiment]

Figure 20:
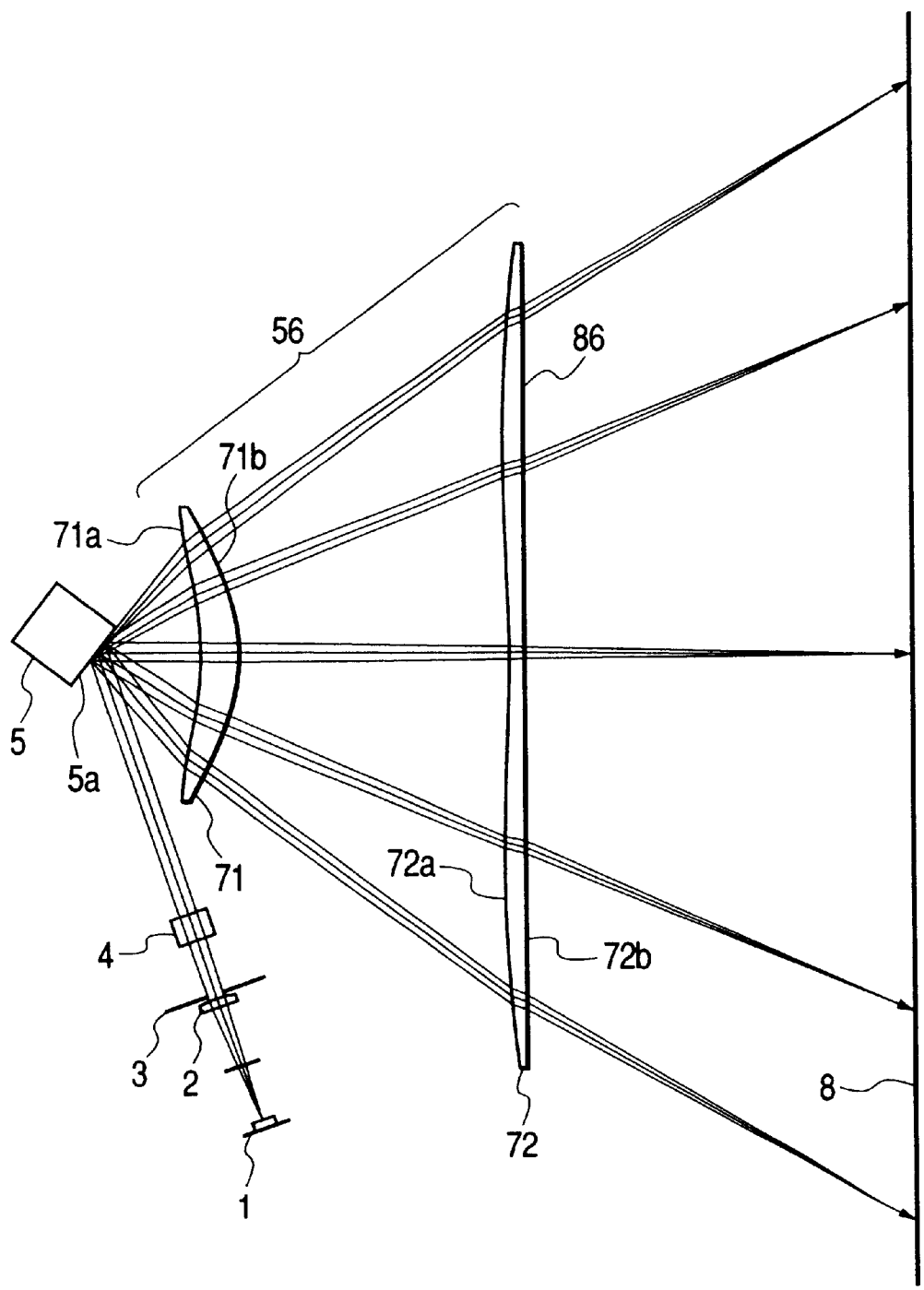
FIG. 20 is a sectional view showing the main part of the optical system of a scanning optical device constituting a color image forming apparatus in the main scanning direction according to the sixth embodiment of the present invention.

FIG. 20 is a sectional view (sectional view of main scanning) of the main part of an optical system showing one of a plurality of scanning optical devices constituting a color image forming apparatus in the main scanning direction according to the sixth embodiment of the present invention, and a corresponding photosensitive drum. In FIG. 20, the same reference numerals as in FIG. 12 denote the same parts.

The sixth embodiment is different from the fifth embodiment in that a plastic toric lens as a refraction element is made of a material such as polycarbonate (PC) having a large dispersion, and that the power ratio of the refraction element to the diffraction element is optimized. The remaining arrangement and optical action are almost the same as in the fifth embodiment, and provide the same effects.

In FIG. 20, a scanning optical element 56 as a third optical element having an f-θ characteristic has a refraction element 71 and diffraction element 72. The refraction element 71 is formed from a single plastic toric lens of a material such as polycarbonate (PC) having a large dispersion with different powers in the main scanning direction and sub scanning direction. Two lens surfaces 61a and 71b of the toric lens 71 in the main scanning direction are aspherical.

The diffraction element 72 is formed from an elongated composite optical element having different powers in the main scanning direction and sub scanning direction. An incident-side surface 72a of the composite optical element 72 is an aspherical surface having a predetermined power in only the main scanning direction (surface in the sub scanning direction is flat), whereas an exit-side surface 72b is a diffraction surface with a diffraction grating 86 added to a flat surface.

Table 6 shows the optical layout in the sixth embodiment, aspherical coefficients of the toric lens 71, and aspherical coefficients and phase terms of the composite optical element 72.

TABLE 6

Numerical Data of Sixth Embodiment
Design Data

| Wavelength, Refractive Index | | | Surface Shape of Toric Lens 71 | | | Surface Shape of Elongated Diffraction Element 72 | |
|---|---|---|---|---|---|---|---|
| Wavelength Used | λ (nm) | 780 | | First Surface | Second Surface | | First Surface | Second Surface |
| Refractive Index of Toric Lens 71 | ndt | 1.5831 | R | −8.32474E+01 | −4.66932E+01 | R | −3.36204E+02 | ∞ |
| ↑ Abbe Number | vdt | 30.2 | K | −1.49053E+00 | −1.38959E+00 | K | −7.11436E+01 | |
| Refractive Index of Elongated Diffraction Element 72 | ndd | 1.5831 | B4 | 1.00553E−06 | −1.75207E−07 | B4 | 1.91392E−07 | |
| ↑ Abbe Number | vdd | 30.2 | B6 | 1.45168E−09 | 1.59223E−10 | B6 | −1.92184E−11 | |
| Light Ray Angle | | | B8 | −1.11489E−12 | 1.05725E−12 | B8 | 1.14343E−15 | |
| Angle of Incidence on Polygon | θp | −70.0 | B10 | 9.69064E−17 | −6.51123E−16 | B10 | −3.16357E−20 | |

| | | | | | | Phase Function of Elongated Diffraction Element 72 | |
|---|---|---|---|---|---|---|---|
| | | | | | | First Surface | Second Surface |
| Polygon Maximum Exit Angle | θe | 45.0 | r | −1.44495E+02 | −2.53648E+01 | | |
| | | | D2s | | 1.38486E−04 | | |
| Layout | | | D4s | | 5.58624E−08 | b2 | −3.00000E−04 |
| Polygon Surface - Toric Lens | e1 | 30.0 | D6s | | −1.87841E−11 | b4 | 3.89698E−08 |
| Toric Lens Central Thickness | d1 | 11.0 | D2e | | 2.13552E−04 | b6 | −6.36212E−12 |
| Toric Lens - Elongated Diffraction Element | e2 | 75.0 | D4e | | −2.26154E−08 | b8 | 4.84188E−16 |
| Elongated Diffraction Element Central Thickness | d2 | 5.0 | D6e | | 2.79865E−11 | b10 | −1.43626E−20 |
| Elongated Diffraction Element - Surface to be Scanned | Sk | 111.0 | | | | d0 | −5.13463E−03 |
| Polygon Axis - Surface to be Scanned | L | 232.0 | | | | d1 | 1.33067E−06 |
| Effective Scanning Width | W | 297.0 | | | | d2 | 6.96282E−08 |
| | | | | | | d3 | −5.92953E−11 |
| | | | | | | d4 | 6.55739E−13 |

Suffices s indicate laser side
Suffices e indicate side opposite to laser
Y-axis sign + indicates side opposite to laser In the sixth embodiment, similar to the fifth embodiment, the power layout of the plastic toric lens 71 and composite optical element 72 is appropriately set. In the main scanning direction, an imaging position variation caused by a wavelength variation along with an environmental fluctuation, and an imaging position deviation caused by the refractive index variation of the material of the scanning optical element are set to opposite directions at the two ends of the effective image region. In the sub scanning direction, a focus variation caused by an environmental variation is compensated.

Power ratios of the refraction element 71 to the diffraction element 72 in the sixth embodiment are Main Scanning Direction: $\phi Lm/\phi Dm=8.2$ Sub Scanning Direction: $\phi Ls/\phi Ds=2.5$ These power ratios meet excessive correction of the chromatic aberration of magnification and temperature compensation, i.e., conditions (3) and (2).

As a characteristic feature unique to the sixth embodiment, the refraction element is made of a material such as PC having a large dispersion. Hence, the power of the diffraction element can be relatively increased, which is effective in aberration correction and enables high-precision aberration correction.

Figure 21:
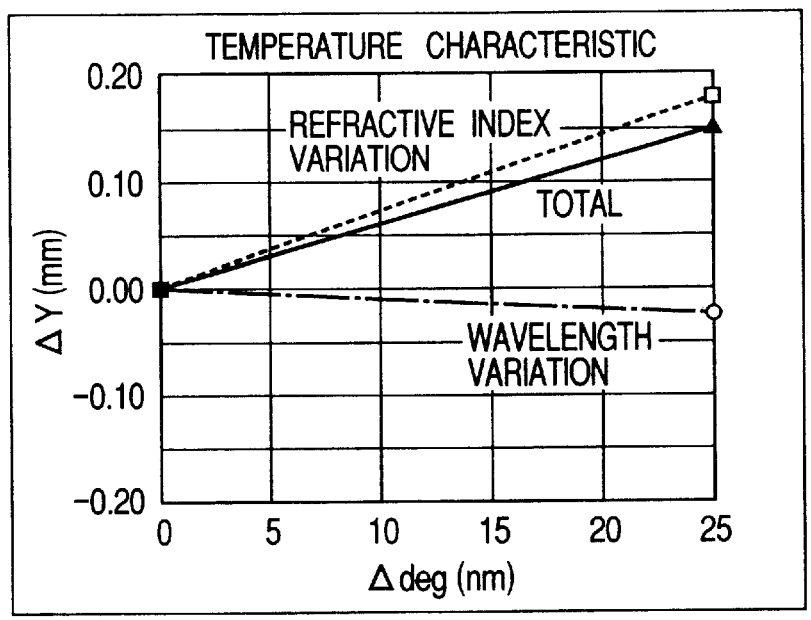
FIG. 21 is a graph showing the imaging position deviation of the most off-axis beam caused by temperature elevation in the sixth embodiment of the present invention.

FIG. 21 is a graph showing an imaging position deviation at the end of the effective image region (most off-axis beam) when the scanning optical device in the sixth embodiment is elevated from room temperature (design temperature). The dotted line represents a component generated upon a decrease in the refractive index of the material of the scanning optical element along with temperature elevation. The chain line represents a component generated upon the wavelength variation of the semiconductor laser along with temperature elevation. The solid line represents an imaging position deviation caused by temperature elevation as the total of these components, both of which are deviation amounts from the design temperature. At a temperature elevated by 25° C., the wavelength of the light source increases by dλ=6.375 nm from the reference wavelength, and the refractive index of the scanning optical element decreases by dn=0.0025.

From FIG. 21, excessive correction of the chromatic aberration of magnification changes the wavelength variation and refractive index variation of an imaging position deviation in opposite directions, i.e., directions in which the imaging position deviation by temperature elevation is canceled.

Figure 22:
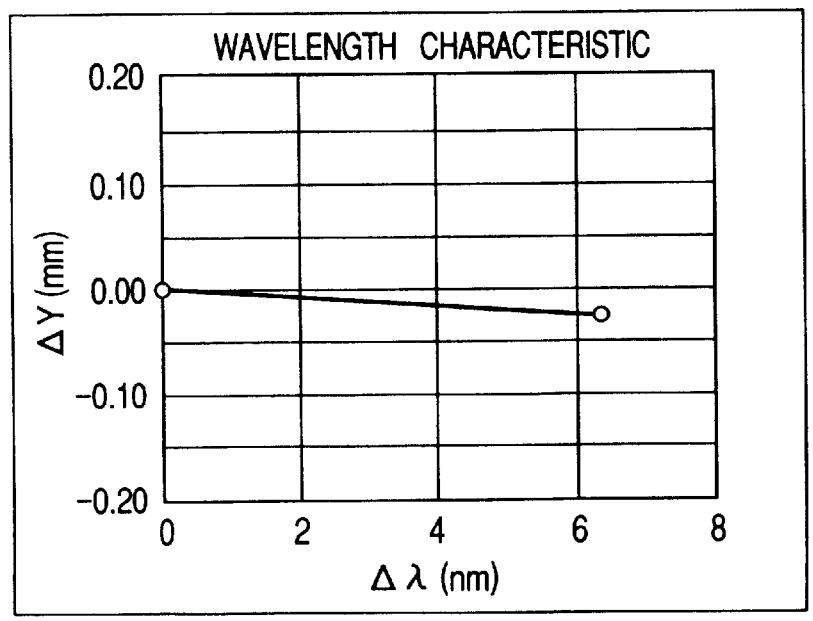
FIG. 22 is a graph showing the imaging position deviation of the most off-axis beam upon a wavelength variation not accompanied by temperature elevation in the sixth embodiment of the present invention.

FIG. 22 is a graph showing an imaging position deviation as a function of a wavelength variation not accompanied by temperature elevation at the end of the effective image region (most off-axis beam). FIG. 22 shows a deviation amount from the reference wavelength.

From FIG. 22, an imaging position deviation in the main scanning direction per unit mode hopping (0.3 nm in the semiconductor laser of the sixth embodiment) is about 1.2 μm which is substantially negligible with respect to a discrete wavelength variation.

Figure 23:
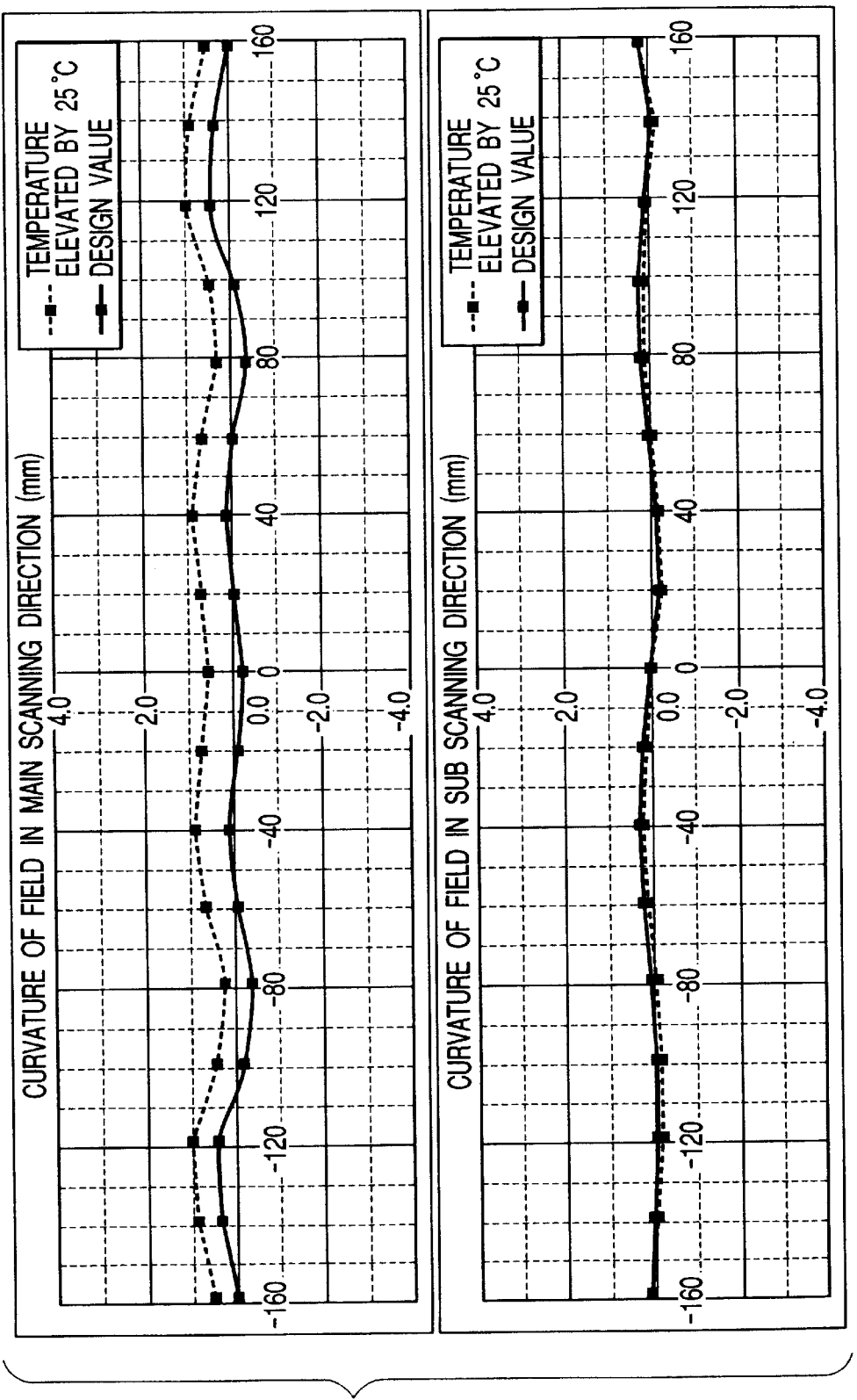
FIG. 23 is a graph showing an imaging position variation in the main scanning direction caused by a wavelength variation in the sixth embodiment of the present invention.
Figure 24:
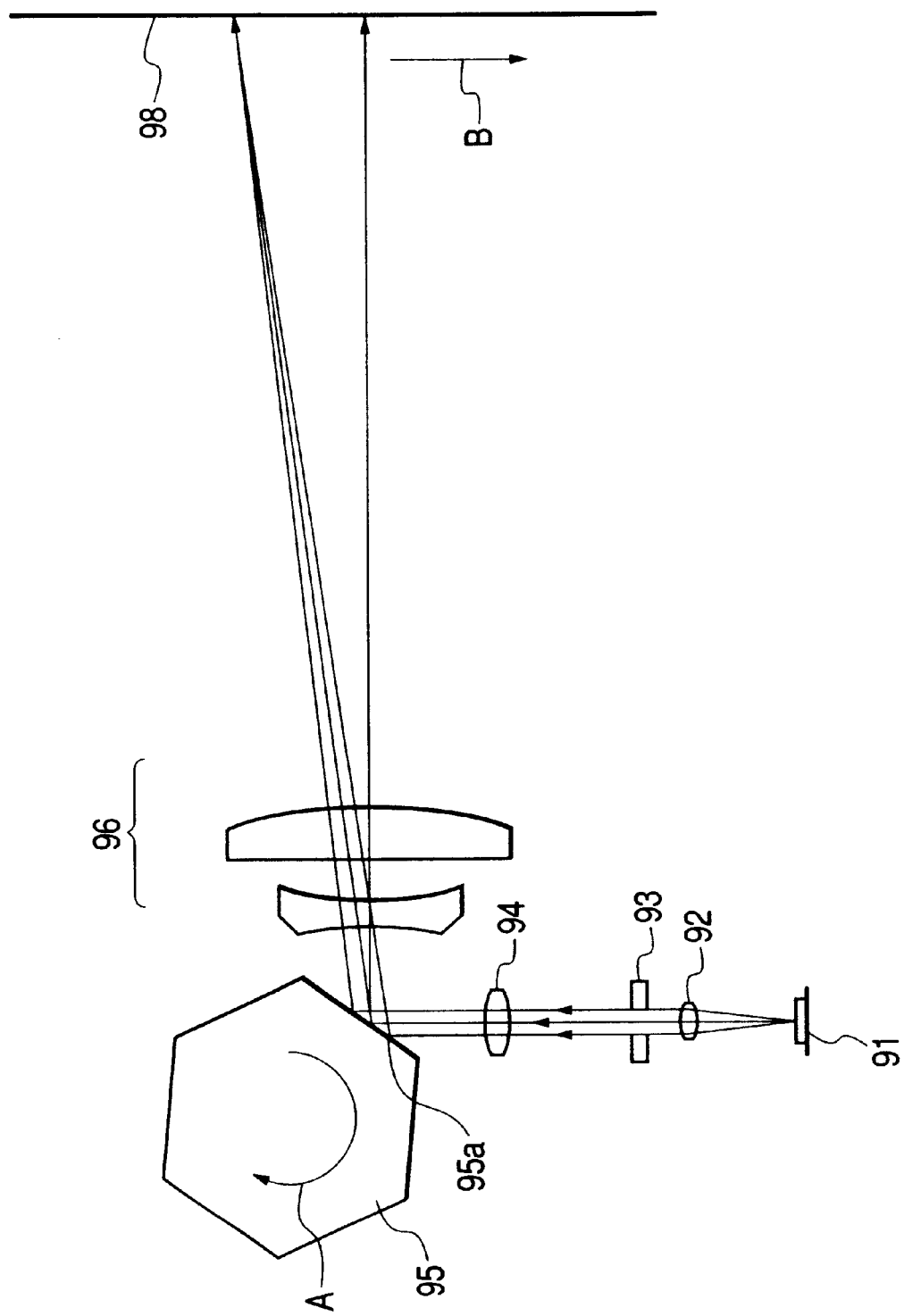
FIG. 24 is a sectional view showing the main part of a conventional scanning optical device in the main scanning direction.
Figure 25:
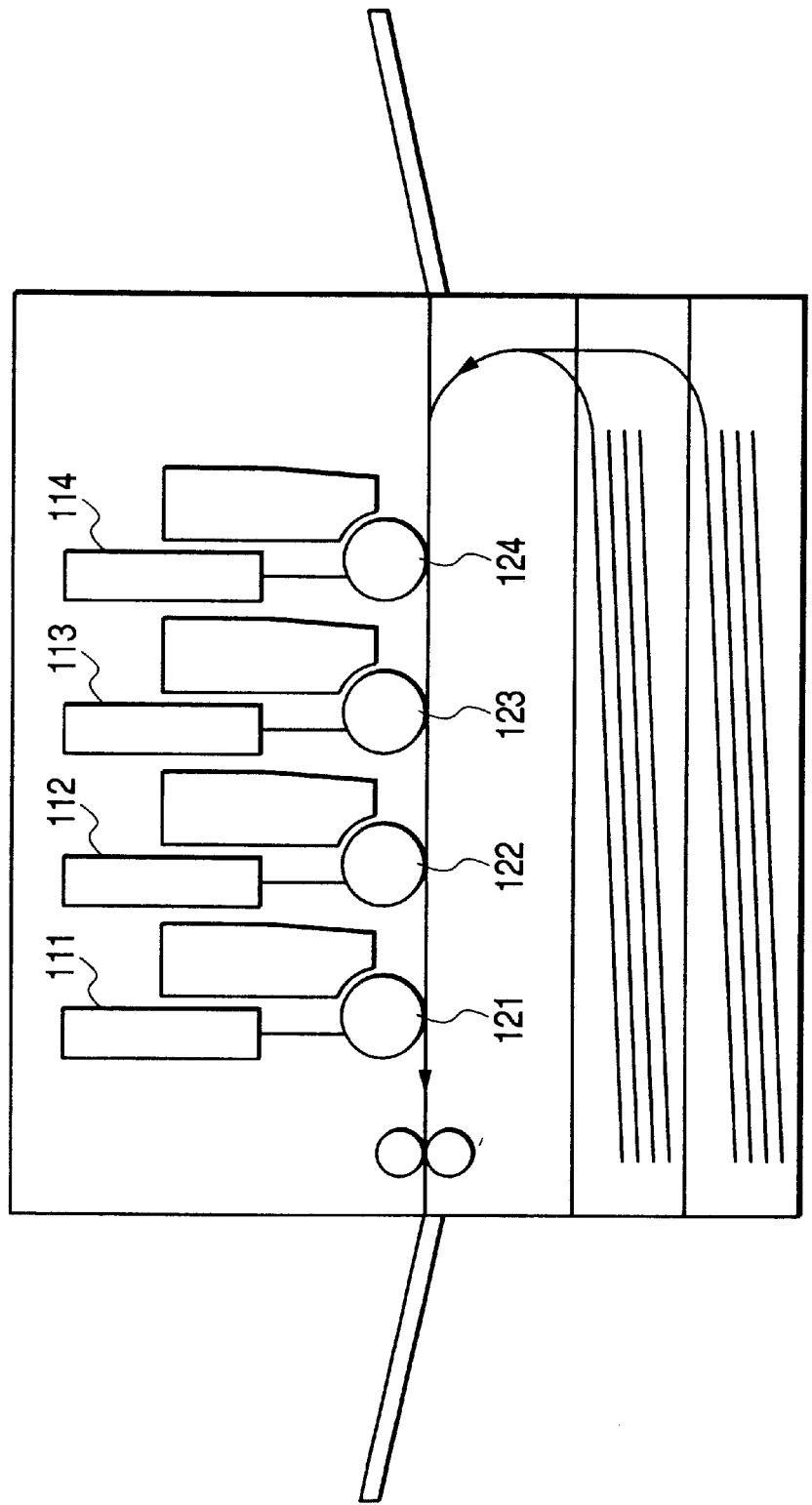
FIG. 25 is a schematic view showing the main part of a conventional color image forming apparatus.

FIG. 23 is a graph showing paraxial aberration (focus position in the main scanning direction and sub scanning direction) before and after an environmental fluctuation in the sixth embodiment. The solid line represents a characteristic (design value) before an environmental fluctuation, and the broken line represents a characteristic (effective value) when the temperature of the scanning optical device is elevated by 25° C.

From FIG. 23, the focus movement amount in the sub scanning direction at a temperature elevated by 25° C. is 0.2 mm in the sixth embodiment, and is suppressed to a visually negligible level both in the sub scanning direction and main scanning direction.

The behavior in temperature elevation has mainly been described for an environmental fluctuation. The same effects can also be attained even in another environmental fluctuation such as temperature drop.

As described above, the sixth embodiment appropriately sets the powers of the refraction element and diffraction element as the scanning optical element of the scanning optical device such that an imaging position deviation in the main scanning direction caused by a wavelength variation along with an environmental fluctuation, and an imaging position deviation caused by the refractive index variation of the material of the scanning optical element are set to opposite directions at the two ends of the effective image region, thereby reducing an imaging position deviation caused by an environmental variation. At the same time, an imaging position deviation caused by a wavelength variation not accompanied by any environmental fluctuation is also set to a desired value or less, thereby implementing a scanning optical device resistant to a wavelength fluctuation or environmental fluctuation. In particular, this embodiment can use PC with a large dispersion to increase the power of the diffraction element, thus implementing a scanning optical device which corrects aberration at high precision.

As described above, the sixth embodiment uses a plurality of scanning optical devices to record images on a plurality of photosensitive drum surfaces. A color image forming apparatus in which misregistration between colors caused by a wavelength fluctuation or environmental fluctuation, and density nonuniformity between colors are reduced can be implemented with a simple arrangement at low cost.

The image forming apparatus in FIG. 1 that is applied to the present invention will be explained in more detail with reference to FIG. 26.

Figure 26:
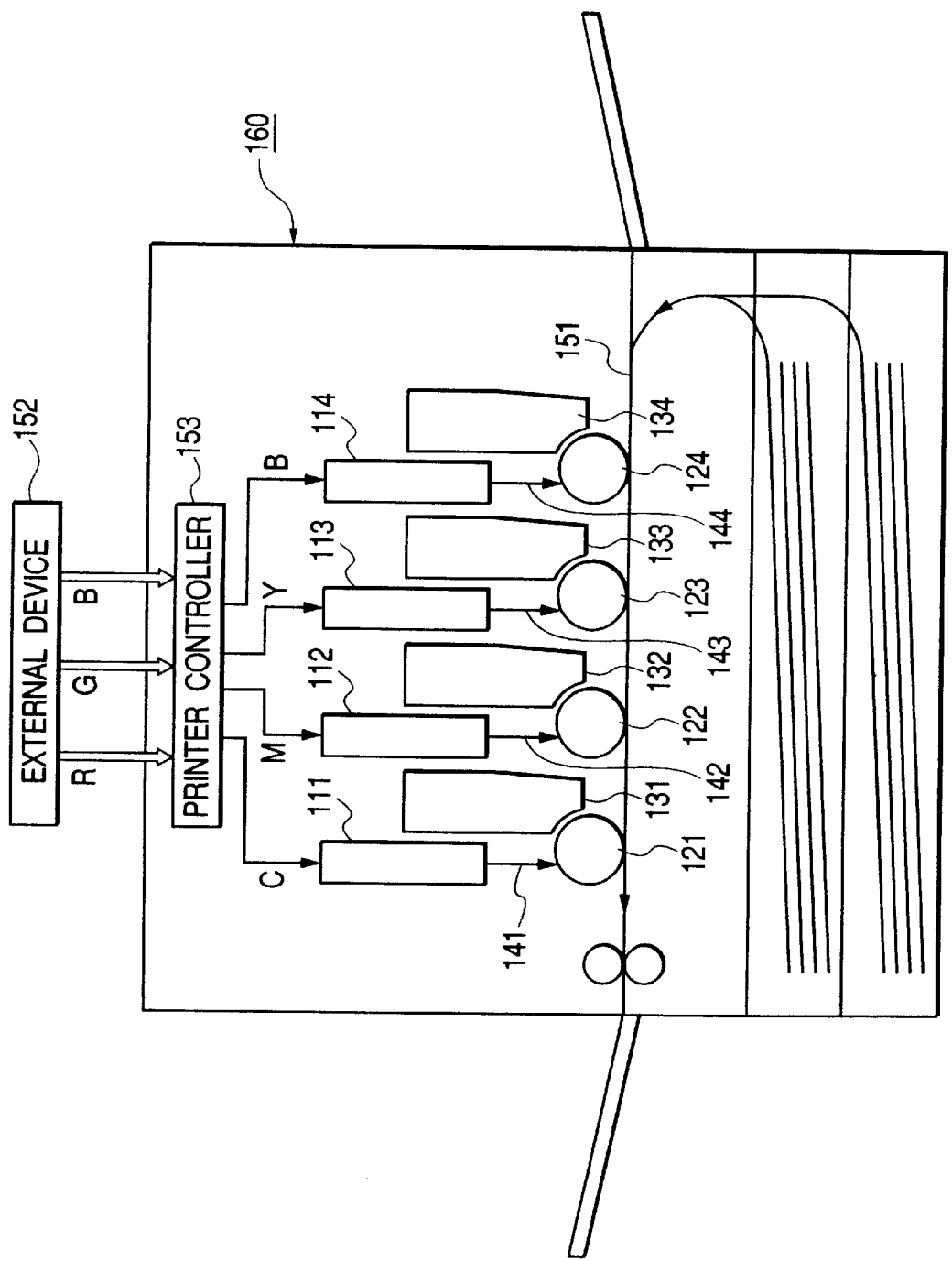
FIG. 26 is a schematic view showing an image forming apparatus according to the present invention.

FIG. 26 is a schematic view showing the main part of an image forming apparatus. This embodiment concerns a tandem type color image forming apparatus in which four scanning optical devices are aligned to record pieces of image information on photosensitive drum surfaces serving as image carriers in parallel with each other. In FIG. 26, a color image forming apparatus 160 comprises scanning optical devices 111, 112, 113, and 114 having any one of the arrangements described in the first to sixth embodiments, photosensitive drums 121, 122, 123, and 124 serving as image carriers, developing units 131, 132, 133, and 134, and a convey belt 151.

In FIG. 26, the color image forming apparatus 160 receives R (Red), G (Green), and B (Blue) color signals from an external device 152 such as a personal computer. These color signals are converted into C (Cyan), M (Magenta), Y (Yellow), and B (Black) image data (dot data) by a printer controller 153 in the apparatus. These image data are respectively input to the scanning optical devices 111, 112, 113, and 114. The scanning optical devices emit beams 141, 142, 143, and 144 modulated in accordance with these image data. The beams scan the photosensitive surfaces of the photosensitive drums 121, 122, 123, and 124 in the main scanning direction.

In the color image forming apparatus of this embodiment, the four scanning optical devices 111, 112, 113, and 114 are aligned, respectively correspond to C (Cyan), M (Magenta), Y (Yellow), and B (Black) colors, and record image signals (image information) on the surfaces of the photosensitive drums 121, 122, 123, and 124 in parallel with each other, thereby printing a color image at a high speed.

In the color image forming apparatus of this embodiment, the four scanning optical devices 111, 112, 113, and 114 use beams based on their image data to form latent images of the respective colors on the surfaces of the corresponding photosensitive drums 121, 122, 123, and 124. After that, the latent images are multiple-transferred to a recording medium to form one full-color image.

As the external device 152, e.g., a color image reading device having a CCD sensor may be used. In this case, the color image reading device and the color image forming apparatus 160 constitute a color digital copying machine.

As has been described above, the present invention can achieve a compact scanning optical device and color image forming apparatus suitable for high-resolution printing in which an imaging position variation caused by the wavelength variation of a light source means, an aberration variation upon an environmental variation (temperature variation), and the like in each scanning optical device are compensated by a compensation means (third optical element) in a color image forming apparatus having a plurality of scanning optical devices, thereby suppressing an imaging position deviation in especially the main scanning direction, and reducing a color deviation and image density nonuniformity at low cost with a simple arrangement.

As has been described above, the present invention can achieve a scanning optical device and color image forming apparatus in which a refraction element and diffraction element are used as the scanning optical element of a scanning optical device, the powers of the refraction element and diffraction element are set such that an imaging position deviation in the main scanning direction caused by a wavelength variation along with the environmental fluctuation of the scanning optical device and an imaging position deviation caused by the refractive index variation of the material of the scanning optical element are set to opposite directions at the two ends of an effective image region (effective scanning region), thereby reducing an imaging position deviation caused by an environmental fluctuation, and at the same time an imaging position deviation caused by a wavelength variation not accompanied by any environmental fluctuation is also set to a desired value or less, thereby implementing a scanning optical device resistant to a wavelength fluctuation or environmental fluctuation, and in which images are recorded on a plurality of image carriers (photosensitive drums) using a plurality of scanning optical devices, thereby implementing with a simple arrangement at low cost a color image forming apparatus which is almost free from misregistration between colors caused by a wavelength fluctuation or environmental fluctuation and almost free from density nonuniformity between colors.

What is claimed is:

1. A scanning optical device comprising light source means and an optical element which forms a beam emitted by said light source means into an image on a surface to be scanned, wherein said optical element comprises a refraction portion and a diffraction portion, and letting $\phi Lm$ and $\phi Dm$ be powers of said refraction portion and said diffraction portion constituting said optical element in a main scanning direction and $\nu L$ be an Abbé number of a material of said refraction portion, the powers satisfy a condition:

$$\nu L/6.90 \leq \phi Lm/\phi Dm \leq \nu L/3.45.$$

2. A device according to claim 1, wherein a focus position deviation in a sub-scanning direction on the surface to be scanned that is caused by the wavelength variation of the beam emitted by said light source means along with the environmental fluctuation, and a focus position deviation in the sub-scanning direction on the surface to be scanned that is caused by the refractive index variation of the material of said optical element along with the environmental fluctuation are substantially compensated within the effective scanning region.

3. A device according to claim 1, wherein the environmental fluctuation includes an atmospheric variation of said scanning optical device and a temperature variation caused by self-temperature elevation.

4. A device according to claim 1, wherein said refraction portion and diffraction portion are formed from a plastic material.

5. A device according to claim 1, wherein said light source means includes a multi-beam laser source having a plurality of light-emitting portions.

6. A device according to claim 1, wherein letting $\phi Ls$ and $\phi Ds$ be powers of said refraction portion and diffraction portion in a sub-scanning direction, those powers satisfy a condition:

$$1.0 \leq \phi Ls/\phi Ds \leq 2.6.$$

7. A device according to claim 1, wherein the powers of said refraction portion and said diffraction portion are set to compensate for an imaging position variation in the main scanning direction on the surface to be scanned that is caused by a wavelength fluctuation of the beam emitted by said light source means.

8. An image forming apparatus which comprises a plurality of pairs of scanning optical devices defined in claim 1 and corresponding image carriers, guides beams emitted by said scanning optical devices to corresponding image carriers, scans surfaces of said image carriers to form images of different colors on the surfaces of said image carriers, and forms a color image by the images formed on the surfaces of said image carriers.

9. A device according to claim 1, wherein powers of said refraction portion and said diffraction portion are set such that an imaging position deviation in a main scanning direction on a surface to be scanned that is caused by a wavelength variation of the beam emitted by said light source means along with an enviromental fluctuation of said scanning optical device, and an imaging position deviation in the main scanning direction on the surface to be scanned that is caused by a refractive index variation of a material of said optical element along with an enviromental fluctuation are set to be in opposite directions at two ends of an effective scanning region.

10. A scanning optical device which guides a beam emitted by light source means to a surface to be scanned, and scans the surface with the beam, wherein said scanning optical device comprises compensation means having a refraction portion and a diffraction portion so as to compensate for an imaging position deviation in a main scanning direction on the surface to be scanned that is caused by a wavelength fluctuation of the beam emitted by said light source means, and letting $\phi Lm$ and $\phi Dm$ be powers of said refraction portion and said diffraction portion in the main scanning direction, the powers satisfy a condition:

$$5.8 \leq \phi Lm/\phi Dm \leq 20.$$

11. A scanning optical device comprising light source means and a scanning optical element which guides a bean emitted by the light source means to a surface to be scanned, wherein said scanning optical element comprises a refraction portion and a diffraction portion, and letting $\phi Lm$ and $\phi Dm$ be powers of said refraction portion and said diffraction portion in the main scanning direction, respectively, the powers satisfy a condition:

$$5.8 \leq \phi Lm/\phi Dm \leq 20.$$

12. A device according to claim 10 or claim 11, wherein a focus position variation in a sub-scanning direction on the surface to be scanned that is caused by an environmental fluctuation of said scanning optical device is compensated by power variations of said refraction portion and said diffraction portion, and a wavelength variation of the beam emitted by said light source means.

13. A device according to claim 10 or claim 11, wherein said refraction portion is formed from a plastic material.

14. A device according to claim 10 or claim 11, wherein said compensation means includes means for forming the beam emitted by said light source means into an image on the surface to be scanned.

15. A device according to claim 10 or claim 11, wherein said light source means includes a multi-beam laser source having a plurality of light-emitting portions.

16. A device according to claim 10 or claim 11, wherein said compensation means includes means for compensating for an imaging position variation in the main scanning direction on the surface to be scanned that is caused by the wavelength fluctuation of the beam emitted by said light source means, and a scanning interval fluctuation in the main scanning direction on the surface to be scanned that is caused by a wavelength difference between beams emitted by a plurality of light-emitting portions.

17. An image forming apparatus which comprises a plurality of pairs of scanning optical devices defined in claim 10 or claim 11, and corresponding image carriers, guides beams emitted by said scanning optical devices to corresponding image carriers, scans surfaces of said image carriers to form images of different colors on the surfaces of said image carriers, and forms a color image by the images formed on the surfaces of said image carriers.

18. A device according to claim 1, claim 10 or claim 11, wherein said refraction portion includes a toric lens, and said diffraction portion includes a composite optical element obtained by integrating a refraction surface and a diffraction surface.

19. An image forming apparatus comprising a scanning optical device defined in any one of claims 1, 10 and 11, and a printer controller for converting code data input from an external device into an image signal and inputting the converted image signal to said scanning optical device.

* * * * *

UNITED STATES PATENT AND TRADEMARK OFFICE
CERTIFICATE OF CORRECTION

PATENT NO. : 6,643,043 B2
DATED : November 4, 2003
INVENTOR(S) : Manabu Kato

It is certified that error appears in the above-identified patent and that said Letters Patent is hereby corrected as shown below:

<u>Tittle page,</u>
Item [75], inventor "Toda (JP)" should read -- Utsunomiya (JP) --.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,643,043 B2
DATED : November 4, 2003
INVENTOR(S) : Manabu Kato

It is certified that error appears in the above-identified patent and that said Letters Patent is hereby corrected as shown below:

Column 7,
Line 10, "convey" should read -- conveyance --.

Column 15,
Lines 53-54,

| "Toric Lens - Elongated Diffraction Element | e2 | 71.9 | D4e | -1.59583e-07 | d0 | -5.03940E-03 |
| Elongated Diffraction Element Central Thickness | d2 | 4.0 | D6e | 1.52979e-10 | d1 | 1.53717E-06" | should read

| --Toric Lens - Elongated Diffraction Element | e2 | 71.9 | D4e | -1.59583E-07 | d0 | -5.03940E-03 |
| Elongated Diffraction Element Central Thickness | d2 | 4.0 | D6e | 1.52979E-10 | d1 | 1.53717E-06--. |

Column 22,
Line 57, "fluctuation" should read -- fluctuation, --.

Column 26,
Line 51, "surfaces 61a" should read -- surfaces 71a --.

Column 32,
Line 8, "bean" should read -- beam --.

Signed and Sealed this

Second Day of November, 2004

JON W. DUDAS
*Director of the United States Patent and Trademark Office*